United States Patent [19]
Tremblay et al.

[11] Patent Number: 6,014,723
[45] Date of Patent: Jan. 11, 2000

[54] PROCESSOR WITH ACCELERATED ARRAY ACCESS BOUNDS CHECKING

[75] Inventors: Marc Tremblay, Palo Alto; James Michael O'Connor, Mountain View, both of Calif.; William N. Joy, Aspen, Colo.

[73] Assignee: Sun Microsystems, Inc., Palo Alto, Calif.

[21] Appl. No.: 08/786,352

[22] Filed: Jan. 23, 1997

Related U.S. Application Data

[63] Continuation-in-part of application No. 08/642,248, May 2, 1996, abandoned
[60] Provisional application No. 60/010,527, Jan. 24, 1996.
[51] Int. Cl.$^7$ .................................................. G06F 17/30
[52] U.S. Cl. ................................................. 711/1; 711/200
[58] Field of Search ...................... 395/185.06; 707/104; 711/1, 200

[56] References Cited

U.S. PATENT DOCUMENTS

| | | | |
|---|---|---|---|
| 3,905,023 | 9/1975 | Perpiglia | 714/6 |
| 4,079,453 | 3/1978 | Dahl | 327/132 |
| 4,084,225 | 4/1978 | Anderson et al. | 711/206 |
| 4,905,188 | 2/1990 | Chuang et al. | 711/128 |
| 5,014,235 | 5/1991 | Morton | 708/520 |
| 5,146,592 | 9/1992 | Pfeiffer et al. | 345/344 |
| 5,341,483 | 8/1994 | Frank et al. | 711/206 |
| 5,373,290 | 12/1994 | Lempel et al. | 341/51 |
| 5,583,988 | 12/1996 | Crank et al. | 395/185.01 |
| 5,644,709 | 7/1997 | Austin | 714/53 |
| 5,777,608 | 7/1998 | Lipovski et al. | 345/509 |
| 5,835,963 | 11/1998 | Yoshioka et al. | 711/207 |

*Primary Examiner*—Wayne Amsbury
*Attorney, Agent, or Firm*—Forrest Gunnison

[57] ABSTRACT

An array boundary checking apparatus is configured to verify that a referenced element of an information array is within a maximum array size boundary value and a minimum array size boundary value. The array boundary checking apparatus of the invention includes an associative memory element that stores and retrieves a plurality of array bound values. Each one of the plurality of array bound values is associated with one of the plurality of array access instructions. An input section simultaneously compares the array access instruction identifier with at least a portion of each of the stored array reference entries, wherein the array access instruction identifier identifies an array access instruction. An output section is configured to provide as an array bounds output values one of the plurality of array bound values stored in one of the plurality of memory locations of the associated memory element. A first comparison element compares the value of the referenced element and the maximum array index boundary value and provides a maximum violation signal if the value of the element is greater than the maximum array size boundary value. A second comparison element compares the value of the element and the minimum array size boundary value and provides a minimum violation signal if the value of the element is less than the minimum array bounds value. Either a maximum violation signal or a minimum violation signal results in an exception.

11 Claims, 12 Drawing Sheets

Microfiche Appendix Included
(2 Microfiche, 122 Pages)

FIG. 6B

Array Instruction:

Load-Array [Array 3] [Elem 26]

PROCESSOR WITH ACCELERATED ARRAY ACCESS BOUNDS CHECKING

RELATED APPLICATIONS

This application claims the benefit of U.S. Provisional Application No. 60/010,527, filed Jan. 24, 1996, entitled "Methods and Apparatuses for Implementing the JAVA Virtual Machine" (JAVA is a trademark of Sun Microsystems, Inc.) and naming Marc Tremblay, James Michael O'Connor, Robert Garner, and William N. Joy as inventors, and is a continuation-in-part application of U.S. Ser. No. 08/642,248, entitled "METHODS AND APPARATUSES FOR ACCELERATING ARRAY ACCESS BOUNDS CHECKING IN A COMPUTER SYSTEM" filed on May 2, 1996, now abandoned and naming Marc Tremblay, James Michael O'Connor, and William N. Joy as inventors, now abandoned, that also claimed the benefit of U.S. Provisional Application No. 60/010,527, filed Jan. 24, 1996, entitled "Methods and Apparatuses for Implementing the JAVA Virtual Machine" and naming Marc Tremblay, James Michael O'Connor, Robert Garner, and William N. Joy as inventors.

CROSS REFERENCE TO MICROFICHE APPENDIX I

Appendix I, which is a part of the present disclosure, is a microfiche appendix consisting of two sheets of microfiche having a total of 122 frames. Microfiche Appendix I is a JAVA Virtual Machine Specification and Appendix A thereto. A portion of the disclosure of this patent document including Appendix I, The JAVA Virtual Machine Specification and Appendix A thereto, contains material which is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever.

BACKGROUND OF THE INVENTION

1. Field of the Invention

The present invention relates generally to computer systems and, in particular, to an enhanced processor and computer system including array access bounds checking 2. Discussion of Related Art Many individuals and organizations in the computer and communications industries tout the Internet as the fastest growing market on the planet. In the 1990s, the number of users of the Internet appears to be growing exponentially with no end in sight. In June of 1995, an estimated 6,642,000 hosts were connected to the Internet; this represented an increase from an estimated 4,852,000 hosts in January, 1995. The number of hosts appears to be growing at around 75% per year. Among the hosts, there were approximately 120,000 networks and over 27,000 web servers. The number of web servers appears to be approximately doubling every 53 days.

In July 1995, with over 1,000,000 active Internet users, over 12,505 usenet news groups, and over 10,000,000 usenet readers, the Internet appears to be destined to explode into a very large market for a wide variety of information and multimedia services.

In addition, to the public carrier network or Internet, many corporations and other businesses are shifting their internal information systems onto an intranet as a way of more effectively sharing information within a corporate or private network. The basic infrastructure for an intranet is an internal network connecting servers and desktops, which may or may not be connected to the Internet through a firewall. These intranets provide services to desktops via standard open network protocols which are well established in the industry. Intranets provide many benefits to the enterprises which employ them, such as simplified internal information management and improved internal communication using the browser paradigm. Integrating Internet technologies with a company's enterprise infrastructure and legacy systems also leverages existing technology investment for the party employing an intranet. As discussed above, intranets and the Internet are closely related, with intranets being used for internal and secure communications within the business and the Internet being used for external transactions between the business and the outside world. For the purposes of this document, the term "networks" includes both the Internet and intranets. However, the distinction between the Internet and an intranet should be born in mind where applicable.

In 1990, programmers at Sun Microsystems wrote a universal programming language. This language was eventually named the JAVA programming language. (JAVA is a trademark of Sun Microsystems of Mountain View, Calif.) The JAVA programming language resulted from programming efforts which initially were intended to be coded in the C++ programming language; therefore, the JAVA programming language has many commonalties with the C++ programming language. However, the JAVA programming language is a simple, object-oriented, distributed, interpreted yet high performance, robust yet safe, secure, dynamic, architecture neutral, portable, and multi-threaded language.

The JAVA programming language has emerged as the programming language of choice for the Internet as many large hardware and software companies have licensed it from Sun Microsystems. The JAVA programming language and environment is designed to solve a number of problems in modern programming practice. The JAVA programming language omits many rarely used, poorly understood, and confusing features of the C++ programming language. These omitted features primarily consist of operator overloading, multiple inheritance, and extensive automatic coercions. The JAVA programming language includes automatic garbage collection that simplifies the task of programming because it is no longer necessary to allocate and free memory as in the C programming language. The JAVA programming language restricts the use of the pointers defined in the C programming language, and instead has true arrays in which array bounds are explicitly checked, thereby eliminating vulnerability to many viruses and nasty bugs. The JAVA programming language includes objective-C interfaces and specific exception handlers.

The JAVA programming language has an extensive library of routines for coping easily with TCP/IP protocol (Transmission Control Protocol based on Internet protocol), HTTP (Hypertext Transfer Protocol) and FTP (File Transfer Protocol). The JAVA programming language is intended to be used in networked/distributed environments. The JAVA programming language enabled the construction of virus-free, tamper-free systems. The authentication techniques are based on public-key encryption.

Many computer system applications utilize arrays. An array is an arrangement of information in one or more dimensions, e.g., a list, a table, or a multidimensional arrangement of data.

In computer systems that implement specific instructions for arrays, an iterative comparison process typically is required to match a specific array access instruction to the associated array. It is then necessary to check the size of the array to verify that it is within acceptable bounds that can be handled by the defined architecture of the computer system.

Array bounds checking results in a more robust system since an array access instruction has access only to those data elements defined by the array and no access to adjacent data is possible This results in fewer bugs and improved system security However, the step-by-step comparison and verification required for array bounds checking, which typically requires at least one cycle per step, consumes valuable processing time until a verification occurs.

What is needed is an apparatus and method to implement array access and to accelerate bounds checking, thereby significantly reducing the time required to retrieve array information and verify its size relative to conventional systems.

SUMMARY OF THE INVENTION

The present invention utilizes a fully associative memory, such as a content addressable memory, to implement array access bounds checking and to accelerate array access bounds checking, thereby significantly reducing the time required to retrieve array information and verify its size relative to conventional systems.

One embodiment of the present invention provides an array boundary checking apparatus that is configured to verify that each access of an information array is within a maximum array size boundary value and a minimum array size boundary value, typically zero. The apparatus includes an associative memory element that stores and retrieves a plurality of array size values. Each pair of the array size values is associated with one of a plurality of array access instructions. Each array access instruction is used to references elements within an array. The associative memory element includes a first memory section, a second memory section, an input section and an output section.

The first memory section includes a first plurality of memory locations configured to receive and store a plurality of array reference entries. Each one of the first plurality of memory locations is configured to store one of the plurality of array reference entries Each one of the plurality of array reference entries corresponds to one of the plurality of array access instructions.

The second memory section includes a second plurality of memory locations configured to receive and store a plurality of array size values. Each one of the second plurality of memory locations is configured to store one pair of the array size values and is associated with one of the first plurality of memory locations. Each one of the plurality of array size values is associated with one of the plurality of array access instructions.

According to the principles of the invention, the input section is coupled to the first memory section and configured to receive an array access instruction identifier. The input section simultaneously compares the array access instruction identifier with at least a portion of each of the stored array reference entries, wherein the array access instruction identifier identifies an array access instruction. The output section, which is coupled to the second memory section, is configured to provide, as an array size output value, one pair of the plurality of array size values stored in one of the second plurality of memory locations which is associated with one of the first plurality of memory locations which stores one of the plurality of array reference entries that matches the array access instruction identifier.

A first comparison element compares the value of the referenced element and the maximum array size boundary value and provides a maximum violation signal if the value of the element is greater than the array size boundary value. A second comparison element compares the value of the element and the minimum array size boundary value and provides a minimum violation signal if the value of the element is less than the array size boundary value. Either a maximum violation signal or a minimum violation signal results in an exception.

Another embodiment of the invention provides a computer system that includes a software translator, an execution unit, an array access processor, and an associative memory element as described above. In this embodiment of the invention, the translation unit is configured to receive and translate a software program and, in accordance therewith, to provide a plurality of translated software instructions and associated instruction identifiers. Each one of the translated software instructions corresponds to one of the instruction identifiers The translated instructions include a plurality of array access instructions. In this embodiment of the invention, the execution unit is configured to receive and execute translated instructions, The execution unit is further configured to respond to an exception output signal generated by the associative memory element and exception element by executing a sequence of translated instructions that define an array access bounds exception subroutine.

These and other features and advantages of the present invention will be apparent from the Figures as 3discussed in the Detailed Description of the Invention.

BRIEF DESCRIPTION OF THE DRAWINGS

FIG. 6B shows a typical array instruction used with the computer system of FIG. 6A or FIG. 6C.

Figure 1A:
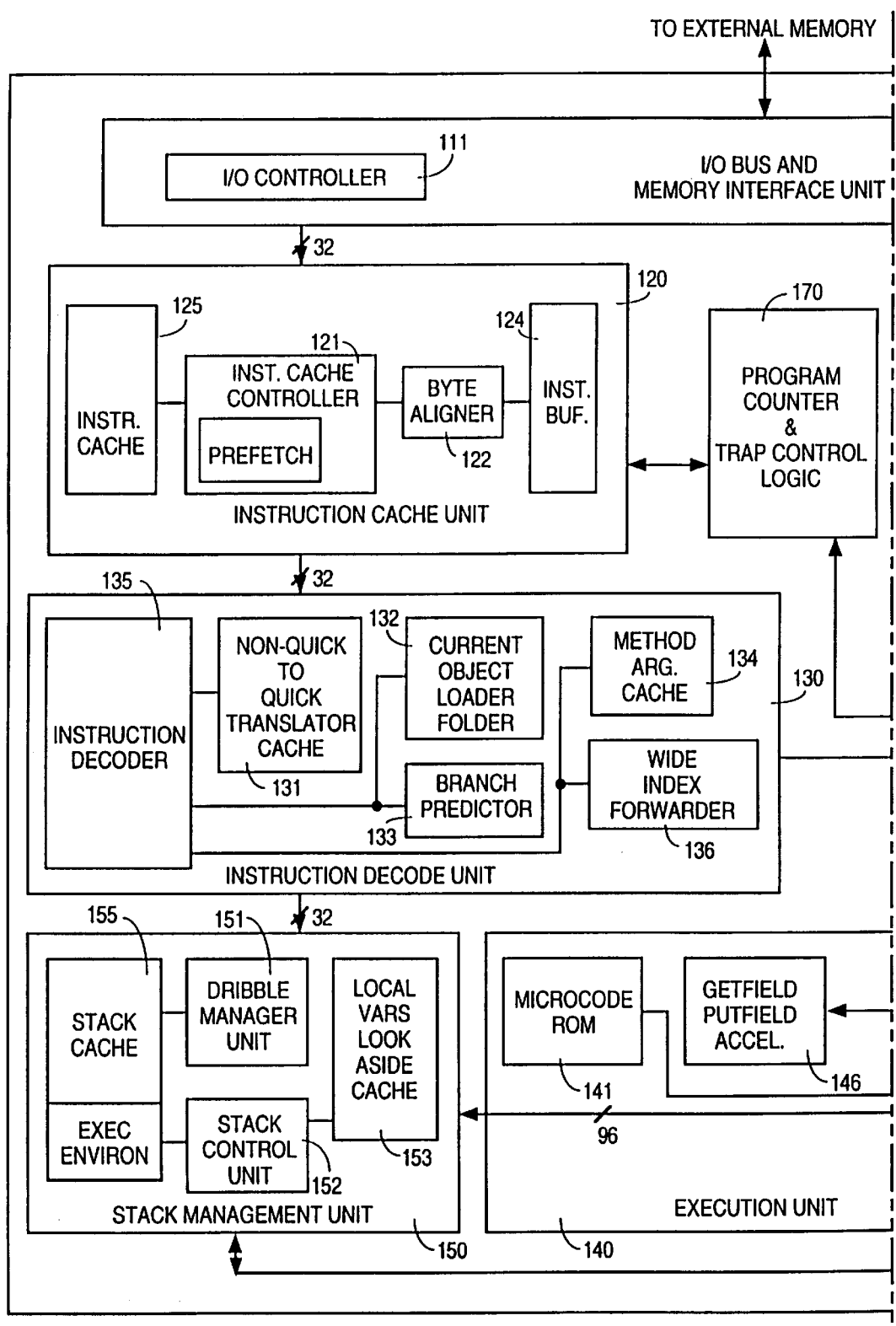
FIG. 1 is a key to FIGS. 1A and 1B, which are a block diagram of one embodiment of virtual machine hardware processor that utilizes the bounds check unit of this invention.

These and other features and advantages of the present invention will be apparent from the Figures as explained in the Detailed Description of the Invention. Like or similar features are designated by the same reference numeral(s) throughout the drawings and the Detailed Description of the Invention.

DETAILED DESCRIPTION OF THE INVENTION

Figure 1B:
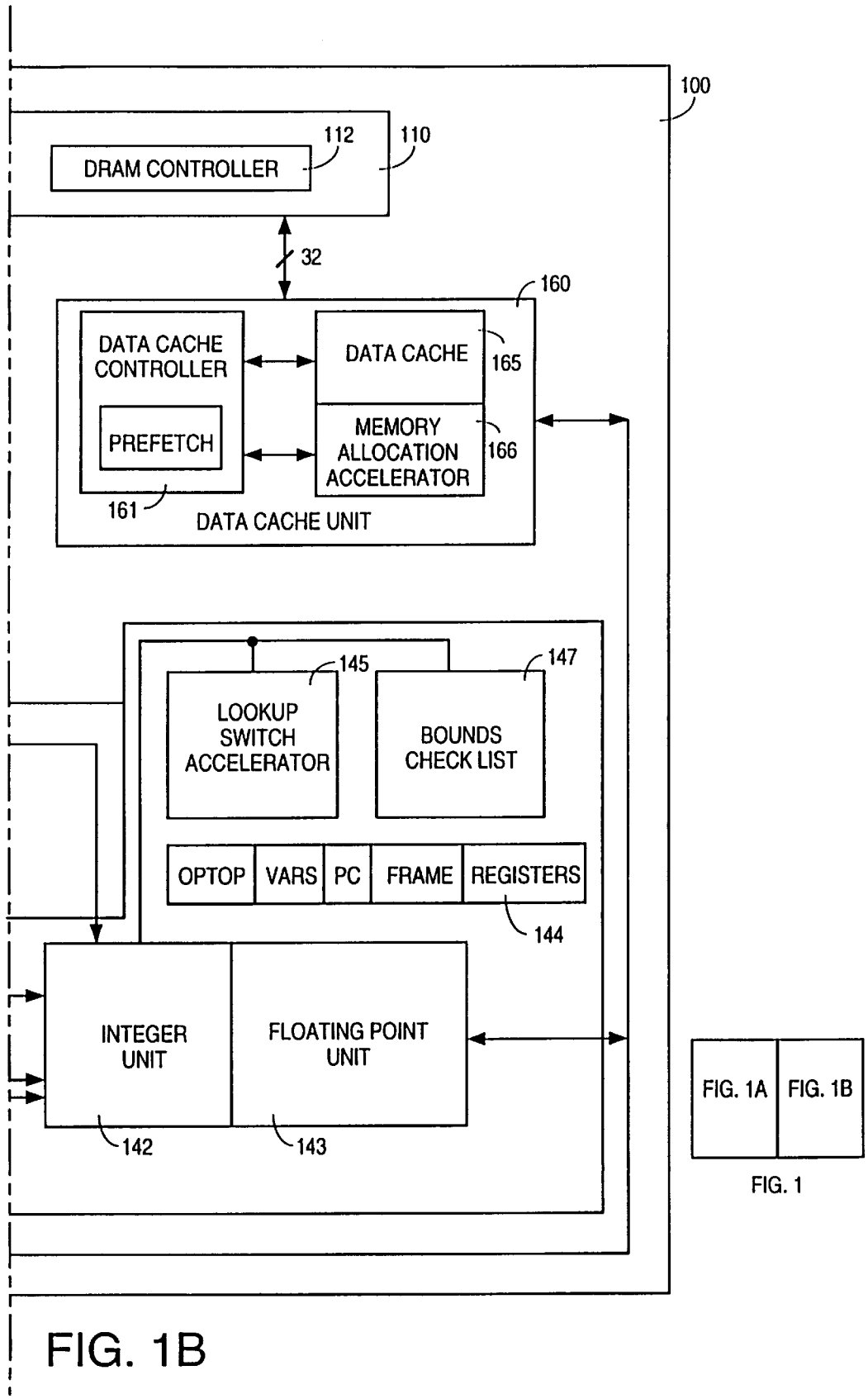

FIG. 1 illustrates one embodiment of a virtual machine instruction hardware processor 100, hereinafter hardware processor 100, that includes a bounds check unit 147 in accordance with the present invention, and that directly executes virtual machine instructions that are processor architecture independent. The performance of hardware processor 100 in executing JAVA virtual machine instructions is much better than high-end CPUs, such as the Intel PENTIUM microprocessor or the Sun Microsystems ULTRASPARC processor, (ULTRASPARC is a trademark of Sun Microsystems of Mountain View, Calif., and PENTIUM is a trademark of Intel Corp. of Sunnyvale, Calif.) interpreting the same virtual machine instructions with a software JAVA interpreter. or with a JAVA just-in-time compiler; is low cost; and exhibits low power consumption. As a result, hardware processor 100 is well suited for portable applications. Hardware processor 100 provides similar advantages for other virtual machine stack-based architectures as well as for virtual machines utilizing features such as garbage collection, thread synchronization, etc.

In view of these characteristics, a system based on hardware processor 100 presents attractive price for performance characteristics, if not the best overall performance, as compared with alternative virtual machine execution environments including software interpreters and just-in-time compilers. Nonetheless, the present invention is not limited to virtual machine hardware processor embodiments, and encompasses any suitable stack-based, or non-stack-based machine implementations, including implementations emulating the JAVA virtual machine as a software interpreter, compiling JAVA virtual machine instructions (either in batch or just-in-time) to machine instruction native to a particular hardware processor, or providing hardware implementing the JAVA virtual machine in microcode, directly in silicon, or in some combination thereof.

Regarding price for performance characteristics, hardware processor 100 has the advantage that the 250 Kilobytes to 500 Kilobytes (Kbytes) of memory storage, e.g., read-only memory or random access memory, typically required by a software interpreter, is eliminated.

A simulation of hardware processor 100 showed that hardware processor 100 executes virtual machine instructions twenty times faster than a software interpreter running on a PENTIUM processor clocked at the same clock rate as hardware processor 100, and executing the same virtual machine instructions. Another simulation of hardware processor 100 showed that hardware processor 100 executes virtual machine instructions five times faster than a just-in-time compiler running on a PENTIUM processor running at the same clock rate as hardware processor 100, and executing the same virtual machine instructions.

In environments in which the expense of the memory required for a software virtual machine instruction interpreter is prohibitive, hardware processor 100 is advantageous. These applications include, for example, an Internet chip for network appliances, a cellular telephone processor, other telecommunications integrated circuits, or other low-power, low-cost applications such as embedded processors, and portable devices.

Bounds check unit 147 of this invention provides a high speed hardware circuit for checking each access to an array to assure that the access is not outside the bounds of the array The use of a hardware circuit, as described more completely below eliminates multiple processor cycles that would normally be associated with array bounds checking Prior to considering bounds check unit 137 in further detail, one embodiment of a hardware processor that includes this invention is described to provide a background for implementation of bounds check unit 137 in a hardware virtual machine implementation.

As used in herein, a virtual machine is an abstract computing machine that, like a real computing machine, has an instruction set and uses various memory areas. A virtual machine specification defines a set of processor architecture independent virtual machine instructions that are executed by a virtual machine implementation, e.g., hardware processor 100. Each virtual machine instruction defines a specific operation that is to be performed. The virtual computing machine need not understand the computer language that is used to generate virtual machine instructions or the underlying implementation of the virtual machine. Only a particular file format for virtual machine instructions needs to be understood.

In an exemplary embodiment, the virtual machine instructions are JAVA virtual machine instructions. Each JAVA virtual machine instruction includes one or more bytecodes that encode instruction identifying information, operands, and any other required information. Microfiche Appendix I, which is incorporated herein by reference in its entirety, includes an illustrative set of the JAVA virtual machine instructions. The particular set of virtual machine instructions utilized is not an essential aspect of this invention. In view of the virtual machine instructions in Microfiche Appendix I and this disclosure, those of skill in the art can modify the invention for a particular set of virtual machine instructions, or for changes to the JAVA virtual machine specification.

Figure 2:
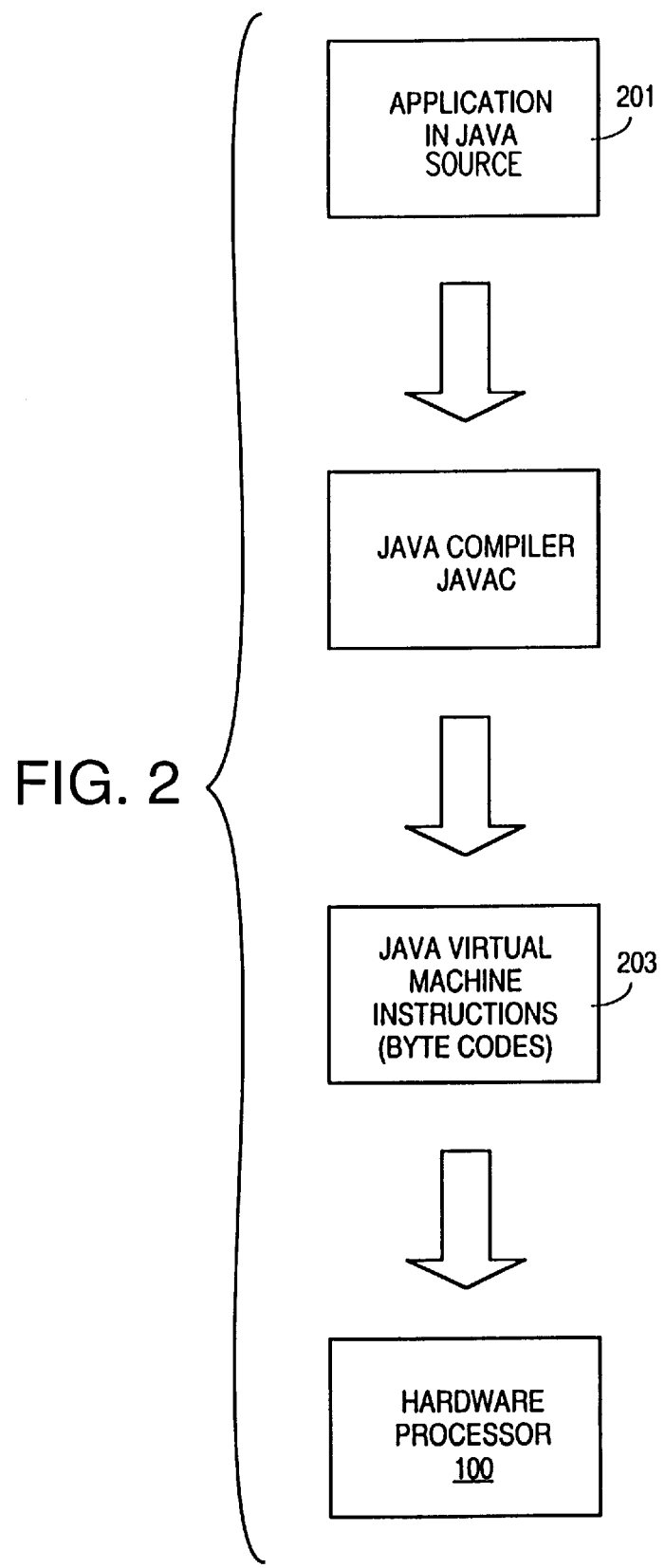
FIG. 2 is a process flow diagram for generation of virtual machine instructions that are used in one embodiment of this invention.

A JAVA compiler JAVAC, (FIG. 2) that is executing on a computer platform, converts an application 201 written in the JAVA computer language to an architecture neutral object file format encoding a compiled instruction sequence 203, according to the JAVA Virtual Machine Specification, that includes a compiled instruction set. However, for this invention, only a source of virtual machine instructions and related information is needed The method or technique used to generate the source of virtual machine instructions and related information is not essential to this invention.

Compiled instruction sequence 203 is executable on hardware processor 100 as well as on any computer platform that implements the JAVA virtual machine using, for example, a software interpreter or just-in-time compiler. However, as described above, hardware processor 100 provides significant performance advantages over the software implementations.

In this embodiment, hardware processor 100 (FIG. 1) processes the JAVA virtual machine instructions, which include bytecodes. Hardware processor 100, as explained more completely below, executes directly most of the bytecodes. However, execution of some of the bytecodes is implemented via microcode.

One strategy for selecting virtual machine instructions that are executed directly by hardware processor 100 is described herein by way of an example. Thirty percent of the JAVA virtual machine instructions are pure hardware translations; instructions implemented in this manner include constant loading and simple stack operations. The next 50% of the virtual machine instructions are implemented mostly, but not entirely, in hardware and require some firmware assistance; these include stack based operations and array instructions. The next 10% of the JAVA virtual machine instructions are implemented in hardware, but require significant firmware support as well; these include function invocation and function return. The remaining 10% of the JAVA virtual machine instructions are not supported in hardware, but rather are supported by a firmware trap and/or microcode; these include functions such as exception handlers. Herein, firmware means microcode stored in ROM that when executed controls the operations of hardware processor 100.

In one embodiment, hardware processor 100 includes an I/O bus and memory interface unit 110, an instruction cache unit 120 including instruction cache 125, an instruction decode unit 130, a unified execution unit 140, a stack management unit 150 including stack cache 155, a data cache unit 160 including a data cache 165, and program counter and trap control logic 170. Each of these units is described more completely below.

Also, as illustrated in FIG. 1, each unit includes several elements. For clarity and to avoid distracting from the invention, the interconnections between elements within a unit are not shown in FIG. 1. However, in view of the following description, those of skill in the art will understand the interconnections and cooperation between the elements in a unit and between the various units.

The pipeline stages implemented using the units illustrated in FIG. 1 include fetch, decode, execute, and write-back stages. If desired, extra stages for memory access or exception resolution are provided in hardware processor 100.

Figure 3:
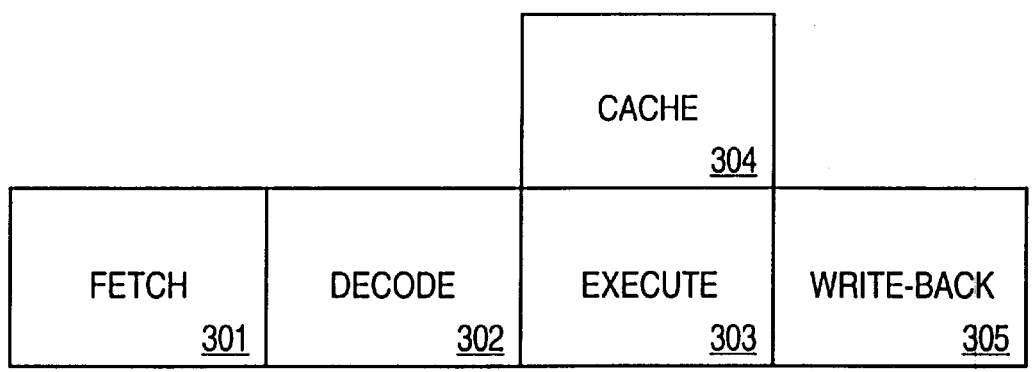
FIG. 3 illustrates an instruction pipeline implemented in the hardware processor of FIG. 1.

FIG. 3 is an illustration of a four stage pipeline for execution of instructions in the exemplary embodiment of processor 100. In fetch stage 301, a virtual machine instruction is fetched and placed in instruction buffer 124 (FIG. 1). The virtual machine instruction is fetched from one of (i) a fixed size cache line from instruction cache 125 or fii) external memory.

With regard to fetching, aside from instructions tableswitch and lookupswitch, (See Microfiche Appendix I.) each virtual machine instruction is between one and five bytes long. Thus, to keep things simple, at least forty bits are required to guarantee that all of a given instruction is contained in the fetch.

Another alternative is to always fetch a predetermined number of bytes, for example, four bytes, starting with the opcode. This is sufficient for 95% of JAVA virtual machine instructions (See Microfiche Appendix I). For an instruction requiring more than three bytes of operands, another cycle in the front end must be tolerated if four bytes are fetched. In this case, the instruction execution can be started with the first operands fetched even if the full set of operands is not yet available.

In decode stage 302 (FIG. 3), the virtual machine instruction at the front of instruction buffer 124 (FIG. 1) is decoded and instruction folding is performed if possible. Stack cache 155 is accessed only if needed by the virtual machine instruction. Register OPTOP, that contains a pointer OPTOP to a top of a stack 400 (FIGS. 4A and 4B), is also updated in decode stage 302 (FIG. 3).

Herein, for convenience, the value in a register and the register are assigned the same reference numeral. Further, in the following discussion, use of a register to store a pointer is illustrative only of one embodiment. Depending on the specific implementation of the invention, the pointer may be implemented using a hardware registers a hardware counter, a software counter, a software pointer, or other equivalent embodiments known to those of skill in the art. The particular implementation selected is not essential to the invention, and typically is made based on a price to performance trade-off.

In execute stage 303, the virtual machine instruction is executed for one or more cycles. Typically, in execute stage 303; an ALU in integer unit 142 (FIG. 1) is used either to do an arithmetic computation or to calculate the address of a load or store from data cache unit (DCU) 160. If necessary, traps are prioritized and taken at the end of execute stage 303 (FIG. 3). For control flow instructions, the branch address is calculated in execute stage 303, as well as the condition upon which the branch is dependent.

Cache stage 304 is a non-pipelined stage. Data cache 165 (FIG. 1) is accessed if needed during execution stage 303 (FIG. 3). The reason that stage 304 is non-pipelined is because hardware processor 100 is a stack-based machine. Thus, the instruction following a load is almost always dependent on the value returned by the load. Consequently, in this embodiment, the pipeline is held for one cycle for a data cache access. This reduces the pipeline stages, and the die area taken by the pipeline for the extra registers and bypasses.

Write-back stage 305 is the last stage in the pipeline. In stage 305, the calculated data is written back to stack cache 155.

Hardware processor 100, in this embodiment, directly implements a stack 400 (FIG. 4A) that supports the JAVA virtual machine stack-based architecture (See Microfiche Appendix I). Sixty-four entries on stack 400 are contained on stack cache 155 in stack management unit 150. Some entries in stack 400 may be duplicated on stack cache 155. Operations on data are performed through stack cache 155.

Stack 400 of hardware processor 100 is primarily used as a repository of information for methods. At any point in time, hardware processor 100 is executing a single method. Each method has memory space, i.e., a method frame on stack 400, allocated for a set of local variables, an operand stack, and an execution environment structure.

A new method frame, e.g., method frame two 410, is allocated by hardware processor 100 upon a method invocation in execution stage 303 (FIG. 3) and becomes the current frame, i.e., the frame of the current method. Current frame 410 (FIG. 4A), as well as the other method frames, may contain a part of or all of the following six entities, depending on various method invoking situations:

Object reference;
Incoming arguments;
Local variables;
Invoker's method context;
Operand stack; and
Return value from method.

Figure 4A:
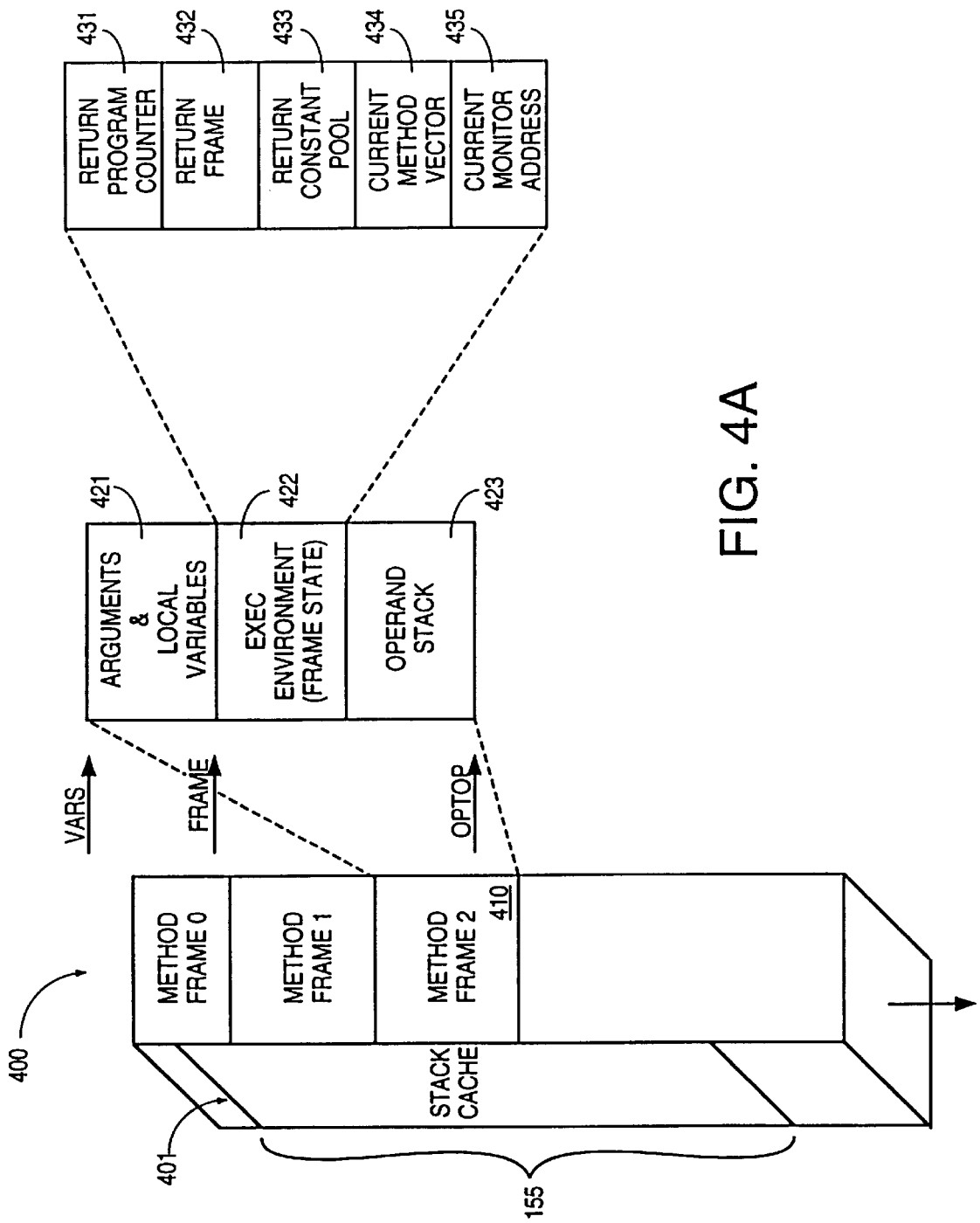
FIG. 4A is an illustration of the one embodiment of the logical organization of a stack structure where each method frame includes a local variable storage area, an environment storage area, and an operand stack utilized by the hardware processor of FIG. 1.

In FIG. 4A, object reference, incoming arguments, and local variables are included in arguments and local variables area 421. The invoker's method context is included in execution environment 422, sometimes called frame state, that in turn includes: a return program counter value 431 that is the address of the virtual machine instruction, e.g., JAVA opcode, next to the method invoke instruction; a return frame 432 that is the location of the calling method's frame; a return constant pool pointer 433 that is a pointer to the calling method's constant pool table; a current method vector 434 that is the base address of the current method's vector table; and a current monitor address 435 that is the address of the current method's monitor.

The object reference is an indirect pointer to an object-storage representing the object being targeted for the method invocation JAVA compiler JAVAC (See FIG. 2.) generates an instruction to push this pointer onto operand stack 423 prior to generating an invoke instruction. This object reference is accessible as local variable zero during the execution of the method. This indirect pointer is not available for a static method invocation as there is no target-object defined for a static method invocation.

The list of incoming arguments transfers information from the calling method to the invoked method. Like the object reference, the incoming arguments are pushed onto stack 400 by JAVA compiler generated instructions and may be accessed as local variables. JAVA compiler JAVAC (See FIG. 2.) statically generates a list of arguments for current method 410 (FIG. 4A), and hardware processor 100 determines the number of arguments from the list. When the object reference is present in the frame for a non-static method invocation, the first argument is accessible as local variable one. For a static method invocation, the first argument becomes local variable zero.

For 64-bit arguments, as well as 64-bit entities in general, the upper 32-bits, i.e., the 32 most significant bits, of a 64-bit entity are placed on the upper location of stack 400, i.e., pushed on the stack last. For example, when a 64-bit entity is on the top of stack 400, the upper 32-bit portion of the 64-bit entity is on the top of the stack, and the lower 32-bit portion of the 64-bit entity is in the storage location immediately adjacent to the top of stack 400.

The local variable area on stack 400 (FIG. 4A) for current method 410 represents temporary variable storage space which is allocated and remains effective during invocation of method 410. JAVA compiler JAVAC (FIG. 2) statically determines the required number of local variables and hardware processor 100 allocates temporary variable storage space accordingly.

When a method is executing on hardware processor 100, the local variables typically reside in stack cache 155 and are addressed as offsets from pointer VARS (FIGS. 1 and 4A), which points to the position of the local variable zero. Instructions are provided to load the values of local variables onto operand stack 423 and store values from operand stack into local variables area 421.

The information in execution environment 422 includes the invoker's method context. When a new frame is built for the current method, hardware processor 100 pushes the invoker's method context onto newly allocated frame 410, and later utilizes the information to restore the invoker's method context before returning. Pointer FRAME (FIGS. 1 and 4A) is a pointer to the execution environment of the current method. In the exemplary embodiment, each register in register set 144 (FIG. 1) is 32-bits wide.

Operand stack 423 is allocated to support the execution of the virtual machine instructions within the current method. Program counter register PC (FIG. 1) contains the address of the next instruction, e.g., opcode, to be executed. Locations on operand stack 423 (FIG. 4A) are used to store the operands of virtual machine instructions, providing both source and target storage locations for instruction execution. The size of operand stack 423 is statically determined by JAVA compiler JAVAC (FIG. 2) and hardware processor 100 allocates space for operand stack 423 accordingly. Register OPTOP (FIGS. 1 and 4A) holds a pointer to a top of operand stack 423 The invoked method may return its execution result onto the invoker's top of stack, so that the invoker can access the return value with operand stack references. The return value is placed on the area where an object reference or an argument is pushed before a method invocation.

Simulation results on the JAVA virtual machine indicate that method invocation consumes a significant portion of the execution time (20–40%) Given this attractive target for accelerating execution of virtual machine instructions, hardware support for method invocation is included in hardware processor 100, as described more completely below.

The beginning of the stack frame of a newly invoked method, i.e., the object reference and the arguments passed by the caller, are already stored on stack 400 since the object reference and the incoming arguments come from the top of the stack of the caller. As explained above, following these items on stack 400, the local variables are loaded and then the execution environment is loaded.

One way to speed up this process is for hardware processor 100 to load the needed local variables and execution environment in the background and indicate what has been loaded so far, e.g., simple one bit scoreboarding. Hardware processor 100 tries to execute the bytecodes of the called method as soon as possible, even though stack 400 is not completely loaded. If accesses are made to variables already loaded, overlapping of execution with loading of stack 400 is achieved, otherwise a hardware interlock occurs and hardware processor 100 just waits for the variable or variables to be loaded.

Figure 4B:
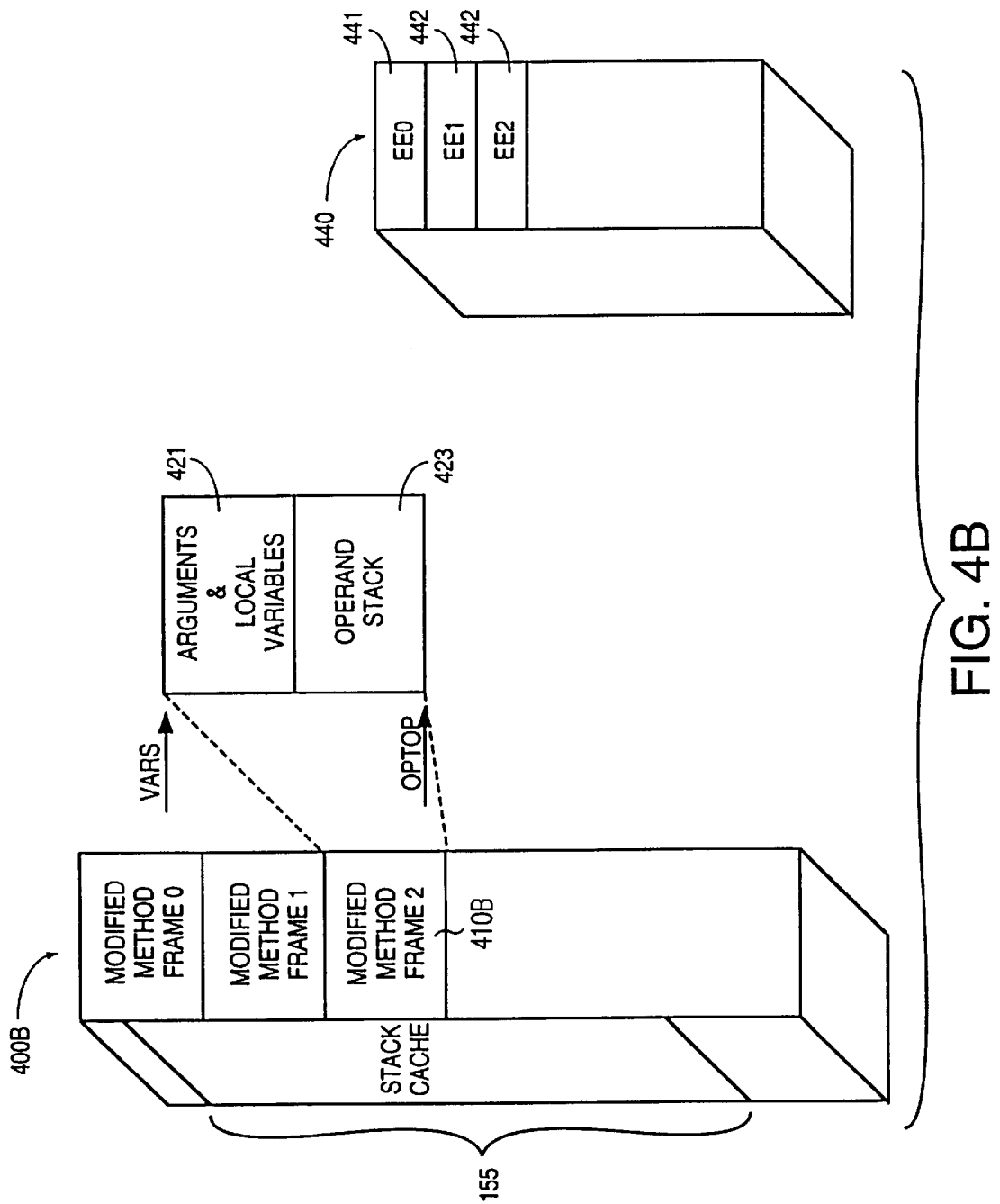
FIG. 4B is an illustration of an alternative embodiment of the logical organization of a stack structure where each method frame includes a local variable storage area and an operand stack on the stack, and an environment storage area for the method frame is included on a separate execution environment stack.

FIG. 4B illustrates another way to accelerate method invocation. Instead of storing the entire method frame in stack 400, the execution environment of each method frame is stored separately from the local variable area and the operand stack of the method frame Thus, in this embodiment, stack 400B contains modified method frames, e.g., modified method frame 410B having only local variable area 421 and operand stack 423. Execution environment 422 of the method frame is stored in an execution environment memory 440. Storing the execution environment in execution environment memory 440 reduces the amount of data in stack cache 155. Therefore, the size of stack cache 155 can be reduced. Furthermore, execution environment memory 440 and stack cache 155 can be accessed simultaneously. Thus, method invocation can be accelerated by loading or storing the execution environment in parallel with loading or storing data onto stack 400B. In one embodiment of stack management unit 150, the memory architecture of execution environment memory 440 is also a stack. As modified method frames are pushed onto stack 400B through stack cache 155, corresponding execution environments are pushed onto execution environment memory 440. For example, since modified method frames 0 to 2, as shown in FIG. 4B, are in stack 400B, execution environments (EE) 0 to 2, respectively, are stored in execution environment memory circuit 440.

To further enhance method invocation, an execution environment cache can be added to improve the speed of saving and retrieving the execution environment during method invocation. The architecture described more completely below for stack cache 155, dribbler manager unit 151, and stack control unit 152 for caching stack 400, can also be applied to caching execution environment memory 440.

Figure 4C:
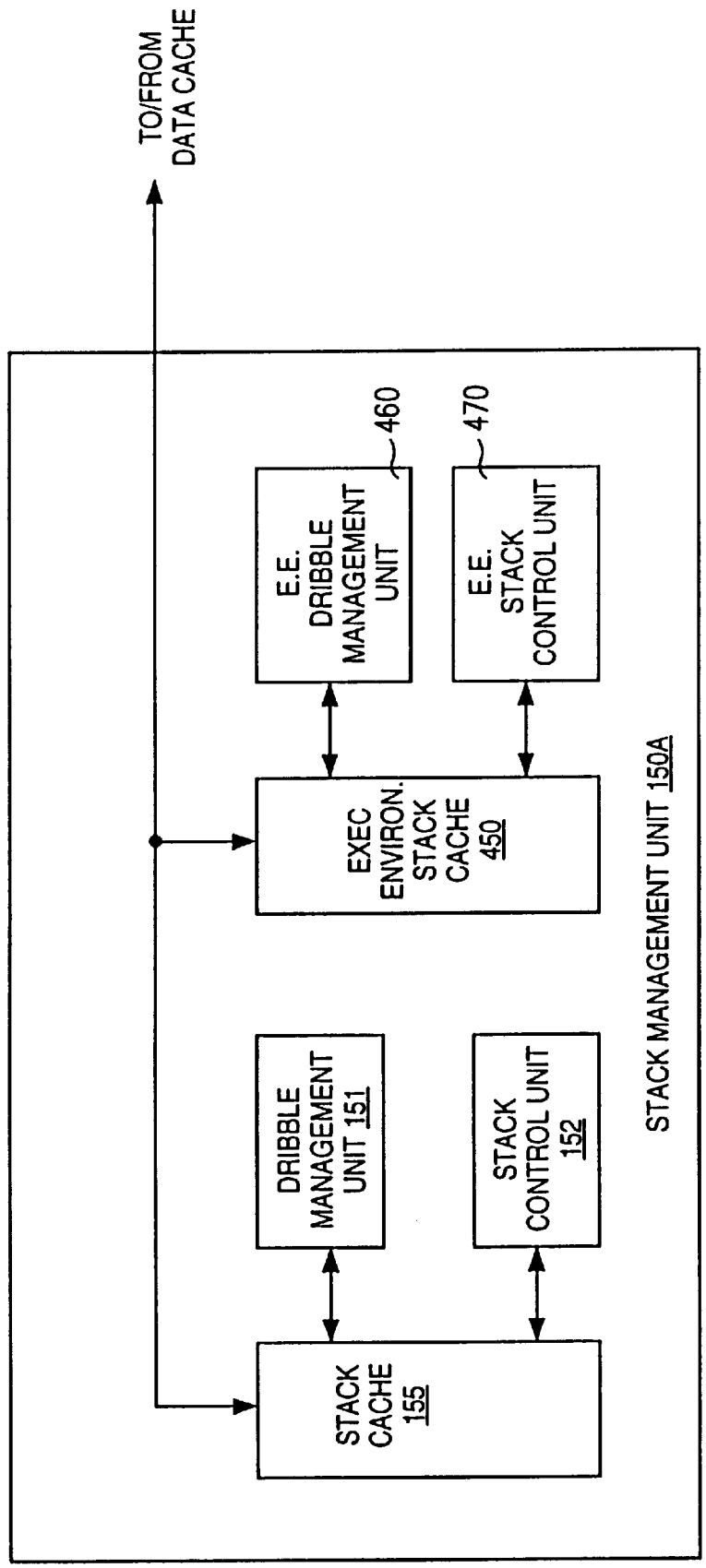
FIG. 4C is an illustration of an alternative embodiment of the stack management unit for the stack and execution environment stack of FIG. 4B.

FIG. 4C illustrates an embodiment of stack management unit 150 modified to support both stack 400B and execution environment memory 440. Specifically, the embodiment of stack management unit 150 in FIG. 4C adds an execution environment stack cache 450, an execution environment dribble manager unit 460, and an execution environment stack control unit 470. Typically, execution dribble manager unit 460 transfers an entire execution environment between execution environment cache 450 and execution environment memory 440 during a spill operation or a fill operation.

I/O Bus and Memory Interface Unit

I/O bus and memory interface unit 110 (FIG. 1), sometimes called interface unit 110, implements an interface between hardware processor 100 and a memory hierarchy which in an exemplary embodiment includes external memory and may optionally include memory storage and/or interfaces on the same die as hardware processor 100. In this embodiment, I/O controller 111 interfaces with external I/O devices and memory controller 112 interfaces with external memory. Herein, external memory means memory external to hardware processor 100. However, external memory either may be included on the same die as hardware processor 100, may be external to the die containing hardware processor 100, or may include both on- and off-die portions.

In another embodiment, requests to I/O devices go through memory controller 112 which maintains an address map of the entire system including hardware processor 100. On the memory bus of this embodiment, hardware processor 100 is the only master and does not have to arbitrate to use the memory bus.

Hence, alternatives for the input/output bus that interfaces with I/O bus and memory interface unit 110 include supporting memory-mapped schemes, providing direct support for PCI, PCMCIA, or other standard busses. Fast graphics (w/VIS or other technology) may optionally be included on the die with hardware processor 100.

I/O bus and memory interface unit 110 generates read and write requests to external memory. Specifically, interface unit 110 provides an interface for instruction cache and data cache controllers 121 and 161 to the external memory. Interface unit 110 includes arbitration logic for internal requests from instruction cache controller 121 and data cache controller 161 to access external memory and in response to a request initiates either a read or a write request on the memory bus to the external memory. A request from data cache controller 161 is always treated as higher priority relative to a request from instruction cache controller 161.

Interface unit 110 provides an acknowledgment signal to the requesting instruction cache controller 121, or data cache controller 161 on read cycles so that the requesting controller can latch the data. On write cycles, the acknowledgment signal from interface unit 110 is used for flow control so that the requesting instruction cache controller 121 or data cache controller 161 does not generate a new request when there is one pending. Interface unit 110 also handles errors generated on the memory bus to the external memory.

Instruction Cache Unit

Instruction cache unit (ICU) 120 (FIG. 1) fetches virtual machine instructions from instruction cache 125 and provides the instructions to instruction decode unit 130. In this embodiment, upon a instruction cache hit, instruction cache controller 121, in one cycle, transfers an instruction from instruction cache 125 to instruction buffer 124 where the instruction is held until integer execution unit IEU, that is described more completely below, is ready to process the instruction. This separates the rest of pipeline 300 (FIG. 3) in hardware processor 100 from fetch stage 301. If it is undesirable to incur the complexity of supporting an instruction-buffer type of arrangement, a temporary one instruction register is sufficient for most purposes. However, instruction fetching, caching, and buffering should provide sufficient instruction bandwidth to support instruction folding as described below.

The front end of hardware processor 100 is largely separate from the rest of hardware processor 100. Ideally, one instruction per cycle is delivered to the execution pipeline.

The instructions are aligned on an arbitrary eight-bit boundary by byte aligner circuit 122 in response to a signal from instruction decode unit 130. Thus, the front end of hardware processor 100 efficiently deals with fetching from any byte position. Also, hardware processor 100 deals with the problems of instructions that span multiple cache lines of cache 125. In this case, since the opcode is the first bytecode, the design is able to tolerate an extra cycle of fetch latency for the operands. Thus, a very simple de-coupling between the fetching and execution of the bytecodes is possible.

In case of an instruction cache miss, instruction cache controller 121 generates an external memory request for the missed instruction to I/O bus and memory interface unit 110. If instruction buffer 124 is empty, or nearly empty, when there is an instruction cache miss, instruction decode unit 130 is stalled, i.e., pipeline 300 is stalled. Specifically, instruction cache controller 121 generates a stall signal upon a cache miss which is used along with an instruction buffer empty signal to determine whether to stall pipeline 300. Instruction cache 125 can be invalidated to accommodate self-modifying code, e.g., instruction cache controller 121 can invalidate a particular line in instruction cache 125.

Thus, instruction cache controller 121 determines the next instruction to be fetched, i.e., which instruction in instruction cache 125 needs to accessed, and generates address, data and control signals for data and tag RAMs in instruction cache 125. On a cache hit, four bytes of data are fetched from instruction cache 125 in a single cycle, and a maximum of four bytes can be written into instruction buffer 124.

Byte aligner circuit 122 aligns the data out of the instruction cache RAM and feeds the aligned data to instruction buffer 124. As explained more completely below, the first two bytes in instruction buffer 124 are decoded to determine the length of the virtual machine instruction. Instruction buffer 124 tracks the valid instructions in the queue and updates the entries, as explained more completely below.

Instruction cache controller 121 also provides the data path and control for handling instruction cache misses. On an instruction cache miss, instruction cache controller 121 generates a cache fill request to I/O bus and memory interface unit 110.

On receiving data from external memory, instruction cache controller 121 writes the data into instruction cache 125 and the data are also bypassed into instruction buffer 124. Data are bypassed to instruction buffer 124 as soon as the data are available from external memory, and before the completion of the cache fill.

Instruction cache controller 121 continues fetching sequential data until instruction buffer 124 is full or a branch or trap has taken place. In one embodiment, instruction buffer 124 is considered full if there are more than eight bytes of valid entries in buffer 124. Thus, typically, eight bytes of data are written into instruction cache 125 from external memory in response to the cache fill request sent to interface unit 110 by instruction cache unit 120. If there is a branch or trap taken while processing an instruction cache miss, only after the completion of the miss processing is the trap or branch executed.

When an error is generated during an instruction cache fill transaction, a fault indication is generated and stored into instruction buffer 124 along with the virtual machine instruction, i.e., a fault bit is set. The line is not written into instruction cache 125. Thus, the erroneous cache fill transaction acts like a non-cacheable transaction except that a fault bit is set. When the instruction is decoded, a trap is taken.

Instruction cache controller 121 also services non-cacheable instruction reads. An instruction cache enable (ICE) bit, in a processor status register in register set 144, is used to define whether a load can be cached. If the instruction cache enable bit is cleared, instruction cache unit 120 treats all loads as non-cacheable loads. Instruction cache controller 121 issues a non-cacheable request to interface unit 110 for non-cacheable instructions. When the data are available on a cache fill bus for the non-cacheable instruction, the data are bypassed into instruction buffer 124 and are not written into instruction cache 125.

In this embodiment, instruction cache 125 is a direct-mapped, eight-byte line size cache. Instruction cache 125 has a single cycle latency. The cache size is configurable to 0K, 1K, 2K, 4K, 8K and 16K byte sizes where K means kilo. The default size is 4K bytes. Each line has a cache tag entry associated with the line. Each cache tag contains a twenty bit address tag field and one valid bit for the default 4K byte size.

Instruction buffer 124, which, in an exemplary embodiment, is a twelve-byte deep first-in, first-out (FIFO) buffer, de-links fetch stage 301 (FIG. 3) from the rest of pipeline 300 for performance reasons. Each instruction in buffer 124 (FIG. 1) has an associated valid bit and an error bit. When the valid bit is set, the instruction associated with that valid bit is a valid instruction. When the error bit is set, the fetch of the instruction associated with that error bit was an erroneous transaction. Instruction buffer 124 includes an instruction buffer control circuit (not shown) that generates signals to pass data to and from instruction buffer 124 and that keeps track of the valid entries in instruction buffer 124, i.e., those with valid bits set.

In an exemplary embodiment, four bytes can be received into instruction buffer 124 in a given cycle. Up to five bytes, representing up to two virtual machine instructions, can be read out of instruction buffer 124 in a given cycle. Alternative embodiments, particularly those providing folding of multi-byte virtual machine instructions and/or those providing folding of more than two virtual machine instructions, provide higher input and output bandwidth. Persons of ordinary skill in the art will recognize a variety of suitable instruction buffer designs including, for example, alignment logic, circular buffer design, etc. When a branch or trap is taken, all the entries in instruction buffer 124 are nullified and the branch/trap data moves to the top of instruction buffer 124.

In the embodiment of FIG. 1, a unified execution unit 140 is shown. However, in another embodiment, instruction decode unit 130, integer unit 142, and stack management unit 150 are considered a single integer execution unit, and floating point execution unit 143 is a separate optional unit. In still other embodiments, the various elements in the execution unit may be implemented using the execution unit of another processor. In general the various elements included in the various units of FIG. 1 are exemplary only of one embodiment. Each unit could be implemented with all or some of the elements shown. Again, the decision is largely dependent upon a price vs. performance trade-off.

Instruction Decode Unit

As explained above, virtual machine instructions are decoded in decode stage 302 (FIG. 3) of pipeline 300. In an exemplary embodiment, two bytes, that can correspond to two virtual machine instructions, are fetched from instruction buffer 124 (FIG. 1). The two bytes are decoded in parallel to determine if the two bytes correspond to two virtual machine instructions, e.g., a first load top of stack instruction and a second add top two stack entries instruction, that can be folded into a single equivalent operation. Folding refers to supplying a single equivalent operation corresponding to two or more virtual machine instructions.

In an exemplary hardware processor 100 embodiment, a single-byte first instruction can be folded with a second instruction. However, alternative embodiments provide folding of more than two virtual machine instructions, e.g., two to four virtual machine instructions, and of multi-byte virtual machine instructions, though at the cost of instruction decoder complexity and increased instruction bandwidth. See U.S. patent application Ser. No. 08/786,351, entitled "INSTRUCTION FOLDING FOR A STACK-BASED MACHINE" naming Marc Tremblay and James Michael O'Connor as inventors, assigned to the assignee of this application, and filed on even date herewith, which is incorporated herein by reference in its entirety. In the exemplary processor 100 embodiment, if the first byte, which corresponds to the first virtual machine instruction, is a multi-byte instruction, the first and second instructions are not folded.

An optional current object loader folder 132 exploits instruction folding, such as that described above, and in greater detail in U.S. patent application Ser. No. 08/786,351, entitled "INSTRUCTION FOLDING FOR A STACK-BASED MACHINE" naming Marc Tremblay and James Michael O'Connor as inventors, assigned to the assignee of this application, and filed on even date herewith, which is incorporated herein by reference in its entirety, in virtual machine instruction sequences which simulation results have shown to be particularly frequent and therefore a desirable target for optimization. In particular, a method invocation typically loads an object reference for the corresponding object onto the operand stack and fetches a field from the object. Instruction folding allow this extremely common virtual machine instruction sequence to be executed using an equivalent folded operation.

Quick variants are not part of the virtual machine instruction set (See Chapter 3 of Microfiche Appendix I), and are invisible outside of a JAVA virtual machine implementation. However, inside a virtual machine implementation, quick variants have proven to be an effective optimization. (See Microfiche Appendix A in Appendix I; which is an integral part of this specification.) Supporting writes for updates of various instructions to quick variants in a non-quick to quick translator cache 131 changes the normal virtual machine instruction to a quick virtual machine instruction to is take advantage of the large benefits bought from the quick variants. In particular, as described in more detail in U.S. patent application Ser. No. 08/788,805, entitled "NON-QUICK INSTRUCTION ACCELERATOR AND METHOD OF IMPLEMENTING SAME" naming Marc Tremblay and James Michael O'Connor as inventors, assigned to the assignee of this application, and filed on even date herewith, which is incorporated herein by reference in its entirety, when the information required to initiate execution of an instruction has been assembled for the first time, the information is stored in a cache along with the value of program counter PC as tag in non-quick to quick translator cache 131 and the instruction is identified as a quick-variant. In one embodiment, this is done with self-modifying code.

Upon a subsequent call of that instruction, instruction decode unit 130 detects that the instruction is identified as a quick-variant and simply retrieves the information needed to initiate execution of the instruction from non-quick to quick translator cache 131. Non-quick to quick translator cache is an optional feature of hardware processor 100.

With regard to branching, a very short pipe with quick branch resolution is sufficient for most implementations. However, an appropriate simple branch prediction mechanism can alternatively be introduced, e.g., branch predictor circuit 133. Implementations for branch predictor circuit 133 include branching based on opcode, branching based on offset, or branching based on a two-bit counter mechanism.

The JAVA virtual machine specification defines an instruction invokenonvirtual, opcode 183, which, upon execution, invokes methods. The opcode is followed by an index byte one and an index byte two. (See Microfiche Appendix I.) Operand stack 423 contains a reference to an object and some number of arguments when this instruction is executed.

Index bytes one and two are used to generate an index into the constant pool of the current class. The item in the constant pool at that index points to a complete method signature and class. Signatures are defined in Microfiche Appendix I and that description is incorporated herein by reference.

The method signature, a short, unique identifier for each method, is looked up in a method table of the class indicated. The result of the lookup is a method block that indicates the type of method and the number of arguments for the method. The object reference and arguments are popped off this method's stack and become initial values of the local variables of the new method. The execution then resumes with the first instruction of the new method. Upon execution, instructions invokevirtual, opcode 182, and invokestatic, opcode 184, invoke processes similar to that just described. In each case, a pointer is used to lookup a method block.

A method argument cache 134, that also is an optional feature of hardware processor 100, is used, in a first embodiment, to store the method block of a method for use after the first call to the method, along with the pointer to the method block as a tag. Instruction decode unit 130 uses index bytes one and two to generate the pointer and then uses the pointer to retrieve the method block for that pointer in cache 134. This permits building the stack frame for the newly invoked method more rapidly in the background in subsequent invocations of the method. Alternative embodiments may use a program counter or method identifier as a reference into cache 134. If there is a cache miss, the instruction is executed in the normal fashion and cache 134 is updated accordingly. The particular process used to determine which cache entry is overwritten is not an essential aspect of this invention. A least-recently used criterion could be implemented, for example.

In an alternative embodiment, method argument cache 134 is used to store the pointer to the method block, for use after the first call to the method, along with the value of program counter PC of the method as a tag. Instruction decode unit 130 uses the value of program counter PC to access cache 134. If the value of program counter PC is equal to one of the tags in cache 134, cache 134 supplies the pointer stored with that tag to instruction decode unit 130. Instruction decode unit 130 uses the supplied pointer to retrieve the method block for the method. In view of these two embodiments, other alternative embodiments will be apparent to those of skill in the art.

Wide index forwarder 136, which is an optional element of hardware processor 100, is a specific embodiment of instruction folding for instruction wide. Wide index forwarder 136 handles an opcode encoding an extension of an index operand for an immediately subsequent virtual machine instruction. In this way, wide index forwarder 136 allows instruction decode unit 130 to provide indices into local variable storage 421 when the number of local variables exceeds that addressable with a single byte index without incurring a separate execution cycle for instruction wide.

Aspects of instruction decoder 135, particularly instruction folding, non-quick to quick translator cache 131, current object loader folder 132, branch predictor 133, method argument cache 134, and wide index forwarder 136 are also useful in implementations that utilize a software interpreter or just-in-time compiler, since these elements can be used to accelerate the operation of the software interpreter or just-in-time compiler. In such an implementation, typically, the virtual machine instructions are translated to an instruction for the processor executing the interpreter or compiler, e.g., any one of a Sun processor, a DEC processor, an Intel processor, or a Motorola processor, for example, and the operation of the elements is modified to support execution on that processor. The translation from the virtual machine instruction to the other processor instruction can be done either with a translator in a ROM or a simple software translator. For additional examples of dual instruction set processors, see U.S. patent application Ser. No. 08/787,618, entitled "A PROCESSOR FOR EXECUTING INSTRUCTION SETS RECEIVED FROM A NETWORK OR FROM A LOCAL MEMORY" naming Marc Tremblay and James Michael O'Connor as inventors, assigned to the assignee of this application, and filed on even date herewith, which is incorporated herein by reference in its entirety.

Integer Execution Unit

Integer execution unit IEU, that includes instruction decode unit 130, integer unit 142, and stack management unit 150, is responsible for the execution of all the virtual machine instructions except the floating point related instructions. The floating point related instructions are executed in floating point unit 143.

Integer execution unit IEU interacts at the front end with instructions cache unit 120 to fetch instructions, with floating point unit (FPU) 143 to execute floating point instructions, and finally with data cache unit (DCU) 160 to execute load and store related instructions. Integer execution unit IEU also contains microcode ROM 141 which contains instructions to execute certain virtual machine instructions associated with integer operations.

Integer execution unit IEU includes a cached portion of stack 400, i.e., stack cache 155. Stack cache 155 provides fast storage for operand stack and local variable entries associated with a current method, e.g., operand stack 423 and local variable storage 421 entries. Although, stack cache 155 may provide sufficient storage for all operand stack and local variable entries associated with a current method, depending on the number of operand stack and local variable entries, less than all of local variable entries or less than all of both local variable entries and operand stack entries may be represented in stack cache 155. Similarly, additional entries, e.g., operand stack and or local variable entries for a calling method, may be represented in stack cache 155 if space allows.

Stack cache 155 is a sixty-four entry thirty-two-bit wide array of registers that is physically implemented as a register file in one embodiment. Stack cache 155 has three read ports, two of which are dedicated to integer execution unit IEU and one to dribble manager unit 151. Stack cache 155 also has two write ports, one dedicated to integer execution unit IEU and one to dribble manager unit 151.

Integer unit 142 maintains the various pointers which are used to access variables, such as local variables, and operand stack values, in stack cache 155. Integer unit 142 also maintains pointers to detect whether a stack cache hit has taken place. Runtime exceptions are caught and dealt with by exception handlers that are implemented using information in microcode ROM 141 and circuit 170.

Integer unit 142 contains a 32-bit ALU to support arithmetic operations. The operations supported by the ALU include: add, subtract, shift, and, or, exclusive or, compare, greater than, less than, and bypass. The ALU is also used to determine the address of conditional branches while a separate comparator determines the outcome of the branch instruction.

The most common set of instructions which executes cleanly through the pipeline is the group of ALU instructions. The ALU instructions read the operands from the top of stack 400 in decode stage 302 and use the ALU in execution stage 303 to compute the result. The result is written back to stack 400 in write-back stage 305. There are two levels of bypass which may be needed if consecutive ALU operations are accessing stack cache 155.

Since the stack cache ports are 32-bits wide in this embodiment, double precision and long data operations take two cycles. A shifter is also present as part of the ALU. If the operands are not available for the instruction in decode stage 302, or at a maximum at the beginning of execution stage 303, an interlock holds the pipeline stages before execution stage 303.

The instruction cache unit interface of integer execution unit IEU is a valid/accept interface, where instruction cache unit 120 delivers instructions to instruction decode unit 130 in fixed fields along with valid bits. Instruction decoder 135 responds by signaling how much byte aligner circuit 122 needs to shift, or how many bytes instruction decode unit 130 could consume in decode stage 302. The instruction cache unit interface also signals to instruction cache unit 120 the branch mis-predict condition, and the branch address in execution stage 303. Traps, when taken, are also similarly indicated to instruction cache unit 120. Instruction cache unit 120 can hold integer unit 142 by not asserting any of the valid bits to instruction decode unit 130. Instruction decode unit 130 can hold instruction cache unit 120 by not asserting the shift signal to byte aligner circuit 122.

The data cache interface of integer execution unit IEU also is a valid-accept interface, where integer unit 142 signals, in execution stage 303, a load or store operation along with its attributes, e.g., non-cached, special stores etc., to data cache controller 161 in data cache unit 160. Data cache unit 160 can return the data on a load, and control integer unit 142 using a data control unit hold signal. On a data cache hit, data cache unit 160 returns the requested data, and then releases the pipeline.

On store operations, integer unit 142 also supplies the data along with the address in execution stage 303. Data cache unit 160 can hold the pipeline in cache stage 304 if data cache unit 160 is busy, e.g., doing a line fill etc.

Floating point operations are dealt with specially by integer execution unit IEU. Instruction decoder 135 fetches and decodes floating point unit 143 related instructions. Instruction decoder 135 sends the floating point operation operands for execution to floating point unit 142 in decode state 302. While floating point unit 143 is busy executing the floating point operation, integer unit 142 halts the pipeline and waits until floating point unit 143 signals to integer unit 142 that the result is available.

A floating point ready signal from floating point unit 143 indicates that execution stage 303 of the floating point operation has concluded. In response to the floating point ready signal, the result is written back into stack cache 155 by integer unit 142. Floating point load and stores are entirely handled by integer execution unit IEU, since the operands for both floating point unit 143 and integer unit 142 are found in stack cache 155.

Stack Management Unit

A stack management unit 150 stores information, and provides operands to execution unit 140. Stack management unit 150 also takes care of overflow and underflow conditions of stack cache 155.

In one embodiment, stack management unit 150 includes stack cache 155 that, as described above, is a three read port, two write port register file in one embodiment; a stack control unit 152 which provides the necessary control signals for two read ports and one write port that are used to retrieve operands for execution unit 140 and for storing data back from a write-back register or data cache 165 into stack cache 155; and a dribble manager 151 which speculatively dribbles data in and out of stack cache 155 into memory whenever there is an overflow or underflow in stack cache 155. In the exemplary embodiment of FIG. 1, memory includes data cache 165 and any memory storage interfaced by memory interface unit 110. In general, memory includes any suitable memory hierarchy including caches, addressable read/write memory storage, secondary storage, etc. Dribble manager 151 also provides the necessary control signals for a single read port and a single write port of stack cache 155 which are used exclusively for background dribbling purposes.

In one embodiment, stack cache 155 is managed as a circular buffer which ensures that the stack grows and shrinks in a predictable manner to avoid overflows or overwrites. The saving and restoring of values to and from data cache 165 is controlled by dribbler manager 151 using high- and low-water marks, in one embodiment.

Stack management unit 150 provides execution unit 140 with two 32-bit operands in a given cycle. Stack management unit 150 can store a single 32-bit result in a given cycle.

Dribble manager 151 handles spills and fills of stack cache 155 by speculatively dribbling the data in and out of stack cache 155 from and to data cache 165. Dribble manager 151 generates a pipeline stall signal to stall the pipeline when a stack overflow or underflow condition is detected. Dribble manager 151 also keeps track of requests sent to data cache unit 160. A single request to data cache unit 160 is a 32-bit consecutive load or store request.

The hardware organization of stack cache 155 is such that, except for long operands (long integers and double precision floating-point numbers), implicit operand fetches for opcodes do not add latency to the execution of the opcodes. The number of entries in operand stack 423 (FIG. 4A) and local variable storage 421 that are maintained in stack cache 155 represents a hardware/performance tradeoff. At least a few operand stack 423 and local variable storage 422 entries are required to get good performance. In the exemplary embodiment of FIG. 1, at least the top three entries of operand stack 423 and the first four local variable storage 421 entries are preferably represented in stack cache 155.

One key function provided by stack cache 155 (FIG. 1) is to emulate a register file where access to the top two registers is always possible without extra cycles. A small hardware stack is sufficient if the proper intelligence is provided to load/store values from/to memory in the background, therefore preparing stack cache 155 for incoming virtual machine instructions.

As indicated above, all items on stack 400 (regardless of size) are placed into a 32-bit word. This tends to waste space if many small data items are used, but it also keeps things relatively simple and free of lots of tagging or muxing. An entry in stack 400 thus represents a value and not a number of bytes. Long integer and double precision floating-point numbers require two entries. To keep the number of read and write ports low, two cycles to read two long integers or two double precision floating point numbers are required.

The mechanism for filling and spilling the operand stack from stack cache 155 out to memory by dribble manager 151 can assume one of several alternative forms. One register at a time can be filled or spilled, or a block of several registers filled or spilled at once. A simple scoreboarded method is appropriate for stack management. In its simplest form, a single bit indicates if the register in stack cache 155 is currently valid. In addition, some embodiments of stack cache 155 use a single bit to indicate whether the data content of the register is saved to stack 400, i.e., whether the register is dirty. In one embodiment, a high-water mark/low-water mark heuristic determines when entries are saved to and restored from stack 400, respectively (FIG. 4A). Alternatively, when the top-of-the-stack becomes close to bottom 401 of stack cache 155 by a fixed, or alternatively, a programmable number of entries, the hardware starts loading registers from stack 400 into stack cache 155. For other embodiments of stack management unit 150 and dribble manager unit 151 see U.S. patent application Ser. No. 08/787,736, entitled "METHODS AND APPARATI FOR STACK CACHING" naming Marc Tremblay and James Michael O'Connor as inventors, assigned to the assignee of this application, and filed on even date herewith, which is incorporated herein by reference in its entirety, and see also U.S. patent application Ser. No. 08/787,617, entitled "STACK CACHING USING MULTIPLE MEMORY CIRCUITS" naming Marc Tremblay and James Michael O'Connor as inventors, assigned to the assignee of this application, and filed on even date herewith, which also is incorporated herein by reference in its entirety.

In one embodiment, stack management unit 150 also includes an optional local variable look-aside cache 153. Cache 153 is most important in applications where both the local variables and operand stack 423 (FIG. 4A) for a method are not located on stack cache 155. In such instances when cache 153 is not included in hardware processor 100, there is a miss on stack cache 155 when a local variable is accessed, and execution unit 140 accesses data cache unit 160, which in turn slows down execution. In contrast, with cache 153, the local variable is retrieved from cache 153 and there is no delay in execution.

Figure 4D:
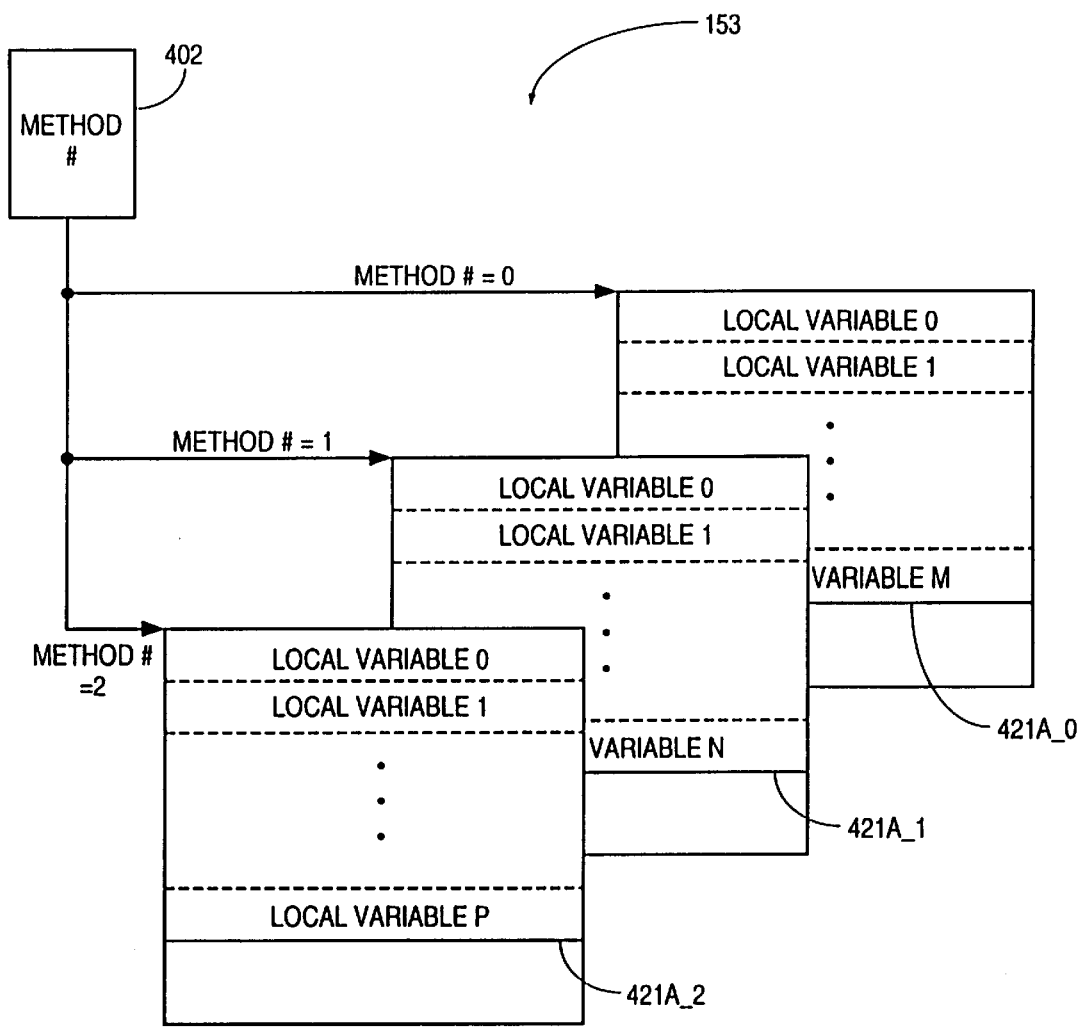
FIG. 4D is an illustration of one embodiment of the local variables look-aside cache in the stack management unit of FIG. 1.

One embodiment of local variable look-aside cache 153 is illustrated in FIG. 4D for method 0 to 2 on stack 400. Local variables zero to M, where M is an integer, for method 0 are stored in plane 421A_0 of cache 153 and plane 421A_0 is accessed when method number 402 is zero. Local variables zero to N, where N is an integer, for method 1 are stored in plane 421A_1 of cache 153 and plane 421A_1 is accessed when method number 402 is one. Local variables zero to P, where P is an integer, for method 1 are stored in plane 421A_2 of cache 153 and plane 421A_2 is accessed when method number 402 is two. Notice that the various planes of cache 153 may be different sizes.

When a new method is invoked, e.g., method 2, a new plane 421A_2 in cache 153 is loaded with the local variables for that method, and method number register 402, which in one embodiment is a counter, is changed, e.g., incremented, to point to the plane of cache 153 containing the local variables for the new method. Notice that the local variables are ordered within a plane of cache 153 so that cache 153 is effectively a direct-mapped cache. Thus, when a local variable is needed for the current method, the variable is accessed directly from the most recent plane in cache 153, i.e., the plane identified by method number 402. When the current method returns, e.g., method 2, method number register 402 is changed, e.g., decremented, to point at previous plane 421A-1 of cache 153. Cache 153 can be made as wide and as deep as necessary.

Data Cache Unit

Data cache unit 160 (DCU) manages all requests for data in data cache 165. Data cache requests can come from dribbling manager 151 or execution unit 140. Data cache controller 161 arbitrates between these requests giving priority to the execution unit requests. In response to a request, data cache controller 161 generates address, data and control signals for the data and tags RAMs in data cache 165. For a data cache hit, data cache controller 161 reorders the data RAM output to provide the right data.

Data cache controller 161 also generates requests to I/O bus and memory interface unit 110 in case of data cache misses, and in case of non-cacheable loads and stores. Data cache controller 161 provides the data path and control logic for processing non-cacheable requests, and the data path and data path control functions for handling cache misses.

For data cache hits, data cache unit 160 returns data to execution unit 140 in one cycle for loads. Data cache unit 160 also takes one cycle for write hits. In case of a cache miss, data cache unit 160 stalls the pipeline until the requested data is available from the external memory. For both non-cacheable loads and stores, data cache 165 is bypassed and requests are sent to I/O bus and memory interface unit 110. Non-aligned loads and stores to data cache 165 trap in software.

Data cache 165 is a two-way set associative, write back, write allocate, 16-byte line cache. The cache size is configurable to 0, 1, 2, 4, 8, 16 Kbyte sizes. The default size is 8 Kbytes. Each line has a cache tag store entry associated with the line. On a cache miss, 16 bytes of data are written into cache 165 from external memory.

Each data cache tag contains a 20-bit address tag field, one valid bit, and one dirty bit. Each cache tag is also associated with a least recently used bit that is used for replacement policy. To support multiple cache sizes, the width of the tag fields also can be varied. If a cache enable bit in processor service register is not set, loads and stores are treated like non-cacheable instructions by data cache controller 161.

A single sixteen-byte write back buffer is provided for writing back dirty cache lines which need to be replaced. Data cache unit 160 can provide a maximum of four bytes on a read and a maximum of four bytes of data can be written into cache 165 in a single cycle. Diagnostic reads and writes can be done on the caches.

Memory Allocation Accelerator

In one embodiment, data cache unit 160 includes a memory allocation accelerator 166. Typically, when a new object is created, fields for the object are fetched from external memory, stored in data cache 165 and then the field is cleared to zero. This is a time consuming process that is eliminated by memory allocation accelerator 166. When a new object is created, no fields are retrieved from external memory. Rather, memory allocation accelerator 166 simply stores a line of zeros in data cache 165 and marks that line of data cache 165 as dirty. Memory allocation accelerator 166 is particularly advantageous with a write-back cache. Since memory allocation accelerator 166 eliminates the external memory access each time a new object is created, the performance of hardware processor 100 is enhanced.

Floating Point Unit

Floating point unit (FPU) 143 includes a microcode sequencer, input/output section with input/output registers, a floating point adder, i.e., an ALU, and a floating point multiply/divide unit. The microcode sequencer controls the microcode flow and microcode branches. The input/output section provides the control for input/output data transactions, and provides the input data loading and output data unloading registers. These registers also provide intermediate result storage.

The floating point adder-ALU includes the combinatorial logic used to perform the floating point adds, floating point subtracts, and conversion operations. The floating point multiply/divide unit contains the hardware for performing multiply/divide and remainder.

Floating point unit 143 is organized as a microcoded engine with a 32-bit data path. This data path is often reused many times during the computation of the result. Double precision operations require approximately two to four times the number of cycles as single precision operations. The floating point ready signal is asserted one-cycle prior to the completion of a given floating point operation. This allows integer unit 142 to read the floating point unit output registers without any wasted interface cycles. Thus, output data is available for reading one cycle after the floating point ready signal is asserted.

Execution Unit Accelerators

Since the JAVA Virtual Machine Specification of Microfiche Appendix I is hardware independent, the virtual machine instructions are not optimized for a particular general type of processor, e.g., a complex instruction set computer (CISC) processor, or a reduced instruction set computer (RISC) processor. In fact, some virtual machine instructions have a CISC nature and others a RISC nature. This dual nature complicates the operation and optimization of hardware processor 100.

For example, the JAVA virtual machine specification defines opcode 171 for an instruction lookupswitch, which is a traditional switch statement. The datastream to instruction cache unit 120 includes an opcode 171, identifying the N-way switch statement, that is followed zero to three bytes of padding. The number of bytes of padding is selected so that first operand byte begins at an address that is a multiple of four.

Following the padding bytes in the datastream are a series of pairs of signed four-byte quantities. The first pair is special. A first operand in the first pair is the default offset for the switch statement that is used when the argument, referred to as an integer key, or alternatively, a current match value, of the switch statement is not equal to any of the values of the matches in the switch statement. The second operand in the first pair defines the number of pairs that follow in the datastream.

Each subsequent operand pair in the datastream has a first operand that is a match value, and a second operand that is an offset. If the integer key is equal to one of the match values, the offset in the pair is added to the address of the switch statement to define the address to which execution branches. Conversely, if the integer key is unequal to any of the match values, the default offset in the first pair is added to the address of the switch statement to define the address to which execution branches. Direct execution of this virtual machine instruction requires many cycles.

To enhance the performance of hardware processor 100, a look-up switch accelerator 145 is included in hardware processor 100. Look-up switch accelerator 145 includes an associative memory which stores information associated with one or more lookup switch statements. For each lookup switch statement, i.e., each instruction lookupswitch, this information includes a lookup switch identifier value, i.e., the program counter value associated with the lookup switch statement, a plurality of match values and a corresponding plurality of jump offset values.

Lookup switch accelerator 145 determines whether a current instruction received by hardware processor 100 corresponds to a lookup switch statement stored in the associative memory. Lookup switch accelerator 145 further determines whether a current match value associated with the current instruction corresponds with one of the match values stored in the associative memory. Lookup switch accelerator 145 accesses a jump offset value from the associative memory when the current instruction corresponds to a lookup switch statement stored in the memory and the current match value corresponds with one of the match values stored in the memory wherein the accessed jump offset value corresponds with the current match value.

Lookup switch accelerator 145 further includes circuitry for retrieving match and jump offset values associated with a current lookup switch statement when the associative memory does not already contain the match and jump offset values associated with the current lookup switch statement. Lookup switch accelerator 145 is described in more detail in U.S. patent application Ser. No. 08/788,811, entitled "LOOK-UP SWITCH ACCELERATOR AND METHOD OF OPERATING SAME" naming Marc Tremblay and James Michael O'Connor as inventors, assigned to the assignee of this application, and filed on even date herewith, which is incorporated herein by reference in its entirety.

In the process of initiating execution of a method of an object, execution unit 140 accesses a method vector to retrieve one of the method pointers in the method vector, i.e., one level of indirection. Execution unit 140 then uses the accessed method pointer to access a corresponding method, i.e., a second level of indirection.

To reduce the levels of indirection within execution unit 140, each object is provided with a dedicated copy of each of the methods to be accessed by the object. Execution unit 140 then accesses the methods using a single level of indirection. That is, each method is directly accessed by a pointer which is derived from the object. This eliminates a level of indirection which was previously introduced by the method pointers. By reducing the levels of indirection, the operation of execution unit 140 can be accelerated. The acceleration of execution unit 140 by reducing the levels of indirection experienced by execution unit 140 is described in more detail in U.S. patent application Ser. No. 08/787,846, entitled "REPLICATING CODE TO ELIMINATE A LEVEL OF INDIRECTION DURING EXECUTION OF AN OBJECT ORIENTED COMPUTER PROGRAM" naming Marc Tremblay and James Michael O'Connor as inventors, assigned to the assignee of this application, and filed on even date herewith, which is incorporated herein by reference in its entirety.

Getfield-putfield Accelerator

Other specific functional units and various translation lookaside buffer (TLB) types of structures may optionally be included in hardware processor 100 to accelerate accesses to the constant pool. For example, the JAVA virtual machine specification defines an instruction putfield, opcode 181, that upon execution sets a field in an object and an instruction getfield, opcode 180, that upon execution fetches a field from an object. In both of these instructions, the opcode is followed by an index byte one and an index byte two. Operand stack 423 contains a reference to an object followed by a value for instruction putfield, but only a reference to an object for instruction getfield.

Index bytes one and two are used to generate an index into the constant pool of the current class. The item in the constant pool at that index is a field reference to a class name and a field name. The item is resolved to a field block pointer which has both the field width, in bytes, and the field offset, in bytes.

An optional getfield-putfield accelerator 146 in execution unit 140 stores the field block pointer for instruction getfield or instruction putfield in a cache, for use after the first invocation of the instruction, along with the index used to identify the item in the constant pool that was resolved into the field block pointer as a tag. Subsequently, execution unit 140 uses index bytes one and two to generate the index and supplies the index to getfield-putfield accelerator 146. If the index matches one of the indexes stored as a tag, i.e., there is a hit, the field block pointer associated with that tag is retrieved and used by execution unit 140. Conversely, if a match is not found, execution unit 140 performs the operations described above. Getfield-putfield accelerator 146 is implemented without using self-modifying code that was used in one embodiment of the quick instruction translation described above.

In one embodiment, getfield-putfield accelerator 146 includes an associative memory that has a first section that holds the indices that function as tags, and a second section that holds the field block pointers. When an index is applied through an input section to the first section of the associative memory, and there is a match with one of the stored indices, the field block pointer associated with the stored index that matched in input index is output from the second section of the associative memory.

Bounds Check Unit

Bounds check unit 147 (FIG. 1) in execution unit 140 is an optional hardware circuit that checks each access to an element of an array to determine whether the access is to a location within the array. When the access is to a location outside the array, bounds check unit 147 issues an active array bound exception signal to execution unit 140. In response to the active array bound exception signal, execution unit 140 initiates execution of an exception handler stored in microcode ROM 141 that in handles the out of bounds array access.

In one embodiment, bounds check unit 147 includes an associative memory element in which is stored a array identifier for an array, e.g., a program counter value, and a maximum value and a minimum value for the array. When an array is accessed, i.e., the array identifier for that array is applied to the associative memory element, and assuming the array is represented in the associative memory element, the stored minimum value is a first input signal to a first comparator element, sometimes called a comparison element, and the stored maximum value is a first input signal to a second comparator element, sometimes also called a comparison element. A second input signal to the first and second comparator elements is the value associated with the access of the array's element.

If the value associated with the access of the array's element is less than or equal to the stored maximum value and greater than or equal to the stored minimum value, neither comparator element generates an output signal. However, if either of these conditions is false, the appropriate comparator element generates the active array bound exception signal. A more detailed description of one embodiment of bounds check unit 147 is provided below.

The JAVA Virtual Machine Specification defines that certain instructions can cause certain exceptions. The checks for these exception conditions are implemented, and a hardware/software mechanism for dealing with them is provided in hardware processor 100 by information in microcode ROM 141 and program counter and trap control logic 170. The alternatives include having a trap vector style or a single trap target and pushing the trap type on the stack so that the dedicated trap handler routine determines the appropriate action.

No external cache is required for the architecture of hardware processor 100. No translation lookaside buffers need be supported.

Figure 5:
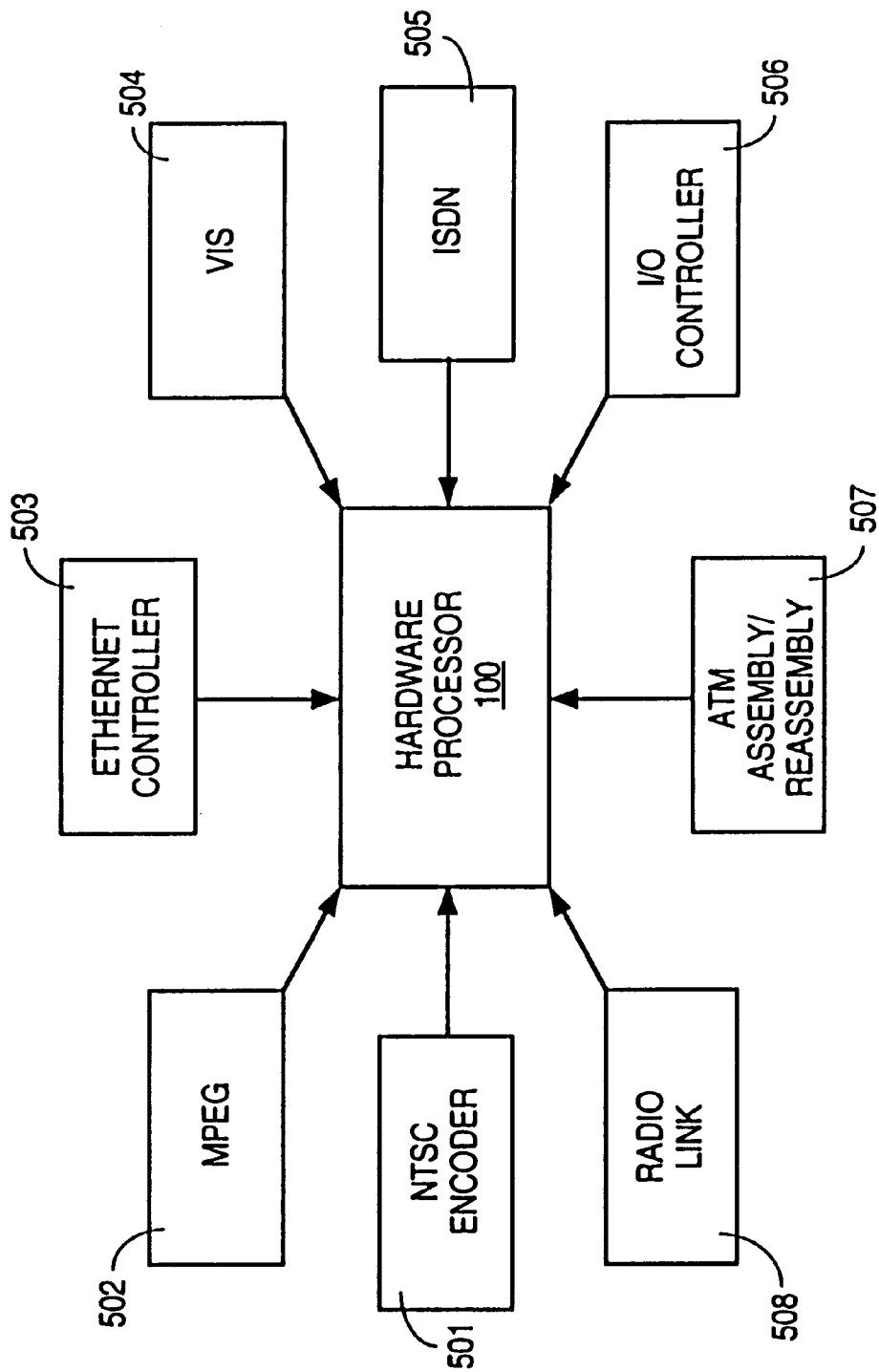
FIG. 5 illustrates several possible add-ons to the hardware processor of FIG. 1.

FIG. 5 illustrates several possible add-ons to hardware processor 100 to create a unique system. Circuits supporting any of the eight functions shown, i.e., NTSC encoder 501, MPEG 502, Ethernet controller 503, VIS 504, ISDN 505, I/O controller 506, ATM assembly/reassembly 507, and radio link 508 can be integrated into the same chip as hardware processor 100 of this invention.

Figure 6A:
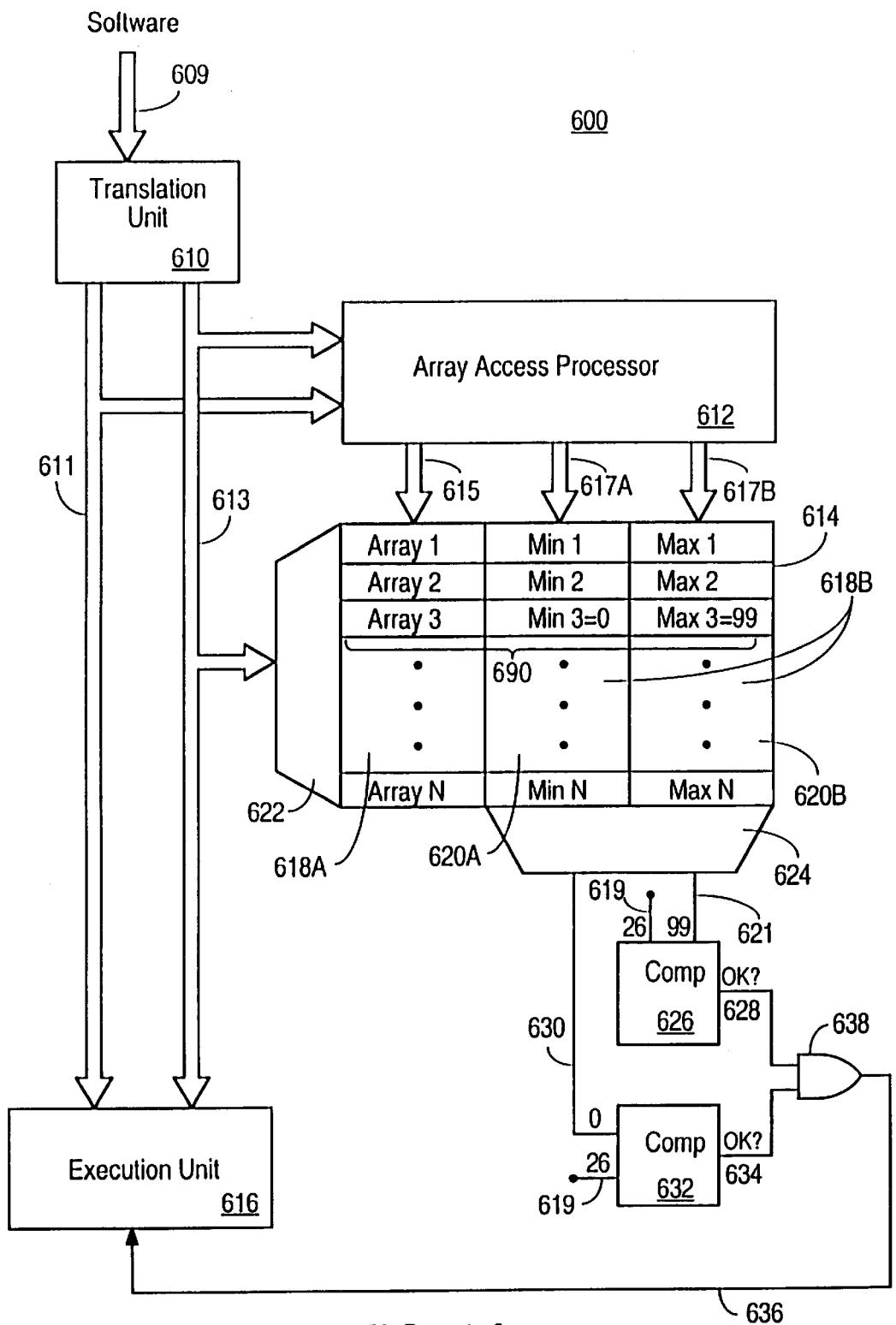
FIG. 6A shows a computer system that includes a translation unit, an array access processor, an array bounds checking element that includes an associative memory device, and an execution unit in accordance with the principles of the invention.

FIG. 6A shows a computer system 600 that includes a translation unit 610, an array access processor 612, an associative memory element 614, and an execution unit 616. Translation unit 610 receives software program information 609, e.g., JAVA virtual machine instructions, and translates program information 609 into translated instructions that include array access instructions on bus 611 and array access instruction identifiers on bus 613, each of which corresponds to one of the translated instructions. Each array access instruction references an element within the array.

Translation unit 610 can be a ROM that converts virtual machine instructions to native instructions for a particular computer architecture; a software program that converts virtual machine instructions to native instructions for a particular computer architecture; or simply an instruction decoder if no translation of the incoming instructions is required.

In one embodiment, translation unit 610 determines which array access instructions will be frequently utilized. For example, utilizing profile feedback, translation unit 610 identifies those array access instructions for which the dynamic execution count is high enough to provide performance benefits by loading these statement identifiers and their corresponding boundaries to an associative memory. In another embodiment, the appropriate array information for each array is stored in the associative memory when the array is created, and when the associate memory becomes full, an appropriate replacement policy is implemented.

When an array is created, array access processor 612 receives an array definition instruction on bus 611 and an array access instruction identifier on bus 613 of the translated software instructions. Array access processor 612 utilizes this information to generate an array reference entry ARRAYi 615 and minimum and maximum array size values MINi 617A and MAXi 617B, respectively, associated with that array reference entry ARRAYi 615 that are all stored in associative memory element 614. In one embodiment, array access processor 612 is simply instructions that are executed by execution unit 616 to load the identifier, and minimum and maximum array size values into associative memory element 614. These instructions could be microcode or provided by translation unit 610.

Associative memory element 614 is configured to verify that when an element in an array is accessed, the element is within a maximum array size value MAXi 617B and a minimum array size value MINI 617A, typically zero, for that array. In the example discussed below and illustrated in FIG. 6A, the array bounds checking apparatus responds to the following array access instruction: load_array [ARRAY3] [ELEM26] as shown in FIG. 6B.

Returning to FIG. 6A, associative memory element 614 includes: a first memory section 618A; a second memory section 618B that may be viewed as divided into a minimum value section 620A and a maximum value section 620B; an input section 622; and an output section 624.

First memory section 618A includes a first plurality of memory locations configured to receive and store a plurality of array reference entries ARRAYI 615, where i=1 through N. Each one of the plurality of array reference entries corresponds to one of the plurality of array access instructions of the translated software instructions that can be provided by translation unit 610.

Second memory section 618B includes a second plurality of memory locations configured to receive and store the minimum array size values MINi 617A and maximum array size values MAXi 617B. Each one of the second plurality of memory locations in second memory section 618B is configured to store one set of minimum and maximum array size values 617A and 617B associated with each one of the plurality of memory locations of ARRAYI 615 first memory section 618A. Hence, each one of the sets of array size values is associated with one of the plurality of array access instructions of the translated software instructions.

Input section 622, which is coupled to first memory section 618A, is configured to receive an array access instruction identifier on bus 613 for a translated software instruction and to simultaneously compare array access instruction identifier 613 with at least a portion of each of the array reference entries ARRAYi 615 stored in first memory section 618A. Each array access instruction identifier 613 identifies a unique array access instruction of the translated software instructions.

Output section 624, which is coupled to second memory section 618B, is configured to provide, a minimum array size output value 630 and a maximum array size output value 621, one of the sets of array size values (MINi 617A, MAXi 617B) stored in one of the second plurality of memory locations in second memory section 618B which is associated with one of the plurality of memory locations which stores one of the plurality of array reference entries ARRAYi 615 that matches the array access instruction identifier, on bus 613, of the translated software instructions. Maximum array size output value 621 and value 619 of the referenced element are compared by a comparator 626 to provide a maximum violation signal on maximum violation signal line 628 if value 619 of the referenced element is greater than maximum array size output value 621. Similarly, minimum array size output value 630, typically zero, is compared with value 619 of the referenced element by a comparator 632 to provide a minimum violation signal on minimum violation signal line 634 if the value 619 of the referenced element is less than minimum array size output value 630. Generation of either a maximum violation signal on line 628 or a minimum violation signal on line 634 results in generation of an exception output signal on line 636 by OR gate 638.

Thus, in the FIG. 6A and 6B example, array access instruction "load_array [ARRAY3] [ELEM26]" (see FIG. 6B) references element 26 in an array associated with array reference entry ARRAY3. Typically, the value on the top of the stack is loaded in element 26 of array three. If element 26 were outside the bounds of array three, information in memory could be overwritten if bounds checking were not employed.

Row 690 in associative memory element 614 is associated with array reference entry ARRAY3. Input section 622 provides a match between the associated array access instruction identifier ARRAY3 on bus 613 and array reference entry ARRAY3. The match causes value MIN3, which is zero in this example, and value MAX3, which is ninety-nine in this example, that are associated with array reference entry ARRAY3, to be provided on lines 630 and 621, respectively, via output section 624. MAX3 value ninety-nine is then compared with the value twenty-six (see FIG. 6B) to verify that the referenced element is less than the established maximum boundary value for the referenced array. Similarly, MIN3 value zero is compared with value twenty-six to verify that the referenced element is greater than the established minimum boundary value for the referenced array. Since the value twenty-six is within the established boundaries, an exception signal is not generated on line 636 (FIG. 6A).

Those skilled in the art will appreciate that a variety of logic functions, in addition to those described above, can be utilized to verify the boundaries and generate an exception signal. Use of compare functions 626 and 632 and OR gate 638 is meant to be illustrative only and not limiting of the invention.

In one embodiment, execution unit 616 is configured to respond to the exception output signal on line 636 by executing a sequence of translated instructions that define an array access boundary exception subroutine.

Figure 6C:
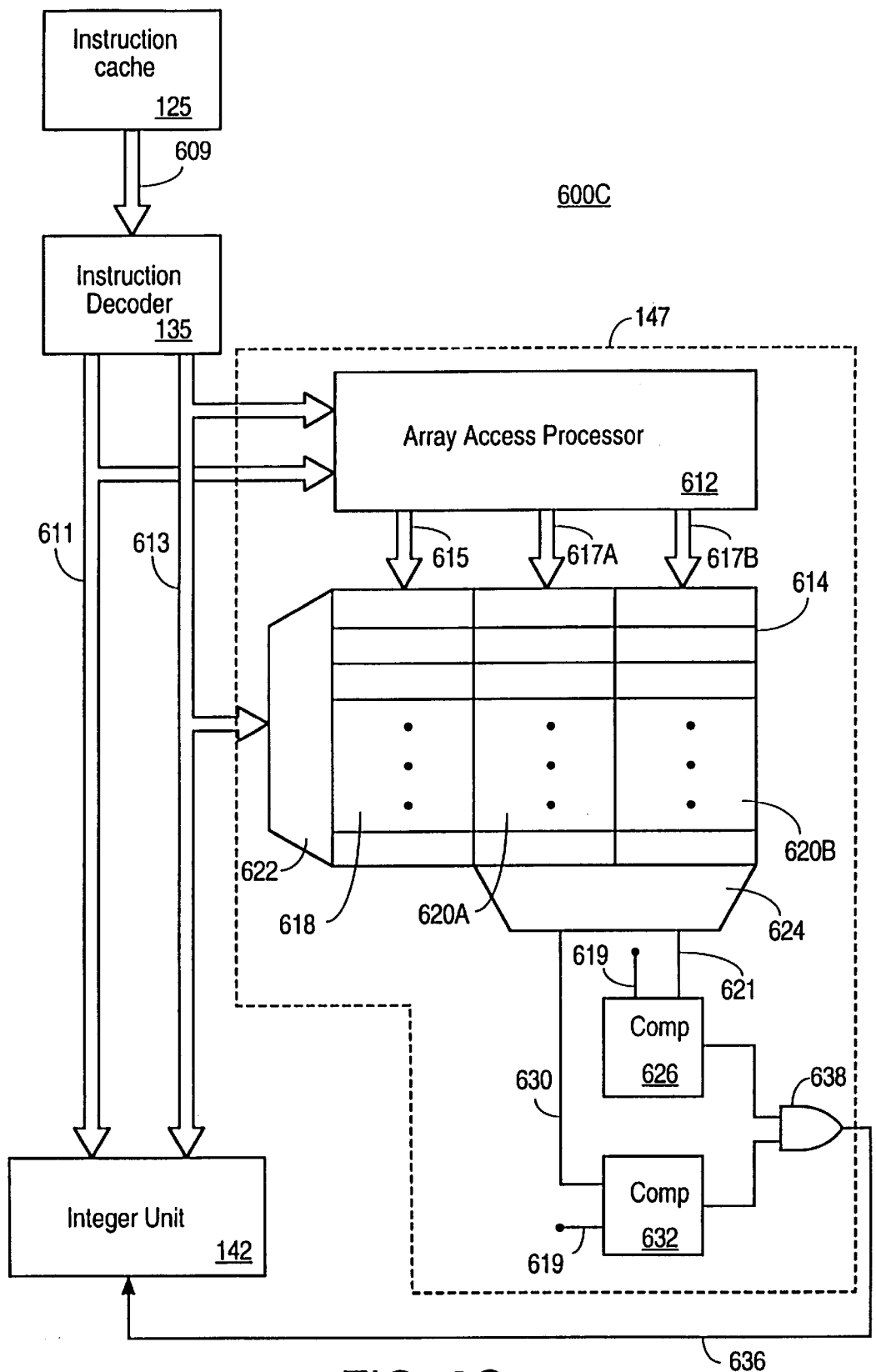
FIG. 6C shows a computer system for operating with, and including portions of, the virtual machine hardware processor of FIG. 1 according to the principles of the invention.

FIG. 6C shows a computer system 600C similar to computer system 600 of FIG. 6A. In the embodiment of the invention shown in FIG. 6C, array access processor 612, associative memory element 614, comparators 626 and 632 and OR gate 638 comprise bounds check unit 147 of FIG. 1. In this embodiment of the invention, instruction cache 125 (FIGS. 1 and 6C) transmit software program information 609 to instruction decoder 135 (FIGS. 1 and 6C) which fulfills the function of translation unit 610 in FIG. 6A. As with computer system 600, in computer system 600C, instruction decoder 135 (FIGS. 1 and 6C) determines, as part of its setup procedure, which array access instructions will be frequently utilized and identifies those array access instructions for which the dynamic execution count is high enough to provide performance results by loading these statement identifiers and their corresponding boundaries into an associative memory. Array access processor 612 then receives the array access instructions 611, and array access instruction identifiers 613 of the translated software instructions and selectively outputs an array reference entry ARRAYi 615 and minimum and maximum array size values MINi 617A and MAXi 617B respectively, associated with the array reference entry ARRAYi 615 for loading into unit 147.

In this embodiment of the invention, the operation of array access processor 612, associative memory device 614, comparator 626, comparator 632, and OR gate 638 are all identical to the operation of like numbered units shown in FIG. 6A and discussed in more detail above.

In the embodiment of the invention shown in FIG. 6C, the exception output signal of OR gate 638 on line 636 is coupled to integer unit 142 of execution unit 140 (FIGS. 1 and 6C). Integer unit 142 is configured to respond to an exception output signal on line 636 by executing a sequence of translated instructions that define an array access boundary exception subroutine.

Those of ordinary skill in the art would be enabled by this disclosure to add to or modify the embodiment of the present invention in various ways as needed and still be within the scope and spirit of various aspects of the present invention. Accordingly, various changes and modifications which are obvious to a person skilled in the art to which the invention pertains are deemed to lie within the spirit and scope of the invention.

What is claimed is:

1. An array bounds checking apparatus configured to verify that each access of an array is within a maximum array size boundary value and a minimum array size boundary value, the apparatus comprising:

an associative memory element configured to store and retrieve array size values which are associated with one of a plurality of array access instructions, each array access instruction referencing a value of a location of an element within the array;

a first comparison element operatively coupled to an output section of the associative memory element, the first comparison element configured to compare a predetermined maximum array size value and the value of the location of the referenced element within the array, and to provide a maximum violation signal if the value of the location of the referenced element within the array is greater than the predetermined maximum array size value; and a second comparison element operatively coupled to the output section of the associative memory element, the second comparison element configured to compare a predetermined minimum array size value and the value of the location of the referenced element within the array, and to provide a minimum violation signal if the value of the location of the referenced element within the array is less than the predetermined minimum array size value.

2. The array bounds checking apparatus of claim 1 further comprising:

an exception element operatively coupled to the first and second comparison elements, the exception element configured to provide an exception signal in response to receipt of either the maximum violation signal or the minimum violation signal.

3. The array bounds checking apparatus of claim 1 wherein the associative memory element further comprises:

a first memory section that includes a first plurality of memory locations configured to receive and store a plurality of array reference entries, wherein each one of the first plurality of memory locations is configured to store one of the plurality of array reference entries, and further wherein each one of the plurality of array reference entries corresponds to one of the plurality of array access instructions;

an input section, operatively coupled to the first memory section, configured to receive an array access instruction identifier and to simultaneously compare the array access instruction identifier with at least a portion of each of the stored plurality of array reference entries, wherein the array access instruction identifier identifies an array access instruction;

a second memory section that includes a second plurality of memory locations configured to receive and store a plurality of array size values, wherein each one of the second plurality of memory locations is configured to store one of the array size values and is associated with one of the first plurality of memory locations, and further wherein each one of the plurality of array size values is associated with one of the plurality of array access instructions and comprises a maximum array size value and a minimum array size value and, further wherein the output section of the associative memory element is operatively coupled to the second memory section, and configured to provide, as an array size output value, one of the plurality of array size values stored in one of the second plurality of memory locations which is associated with one of the first plurality of memory locations in which is stored one of the plurality of array reference entries that matches the array access instruction identifier.

4. An array bounds checking apparatus configured to verify that a refernced element of an array is within a maximum array size boundary value and a minimum array size boundary value, the apparatus comprising:

(a) an associative memory element configured to store and retrieve array size values, wherein the array size values are associated with one of a plurality of array access instructions, each array access instruction referencing a value of a location of an element within the array, the associative memory element including:

(i) a first memory section that includes a first plurality of memory locations configured to receive and store a plurality of array reference entries, wherein each one of the first plurality of memory locations is configured to store one of the plurality of array reference entries, and further wherein each one of the plurality of array reference entries corresponds to one of the plurality of array access instructions;

(ii) a second memory section that includes a second plurality of memory locations configured to receive and store a plurality of array size values, wherein each one of the second plurality of memory locations is configured to store one of the array size values and is associated with one of the first plurality of memory locations, and further wherein each one of the plurality of array size values is associated with one of the plurality of array access instructions and comprises a maximum array size value and a minimum array size value;

(iii) an input section operatively coupled to the first memory section, and configured to receive an array access instruction identifier and to simultaneously compare the array access instruction identifier with at least a portion of each of the stored plurality of array reference entries, wherein the array access instruction identifier identifies an array access instruction; and (iv) an output section, operatively coupled to the second memory section, configured to provide, as an array size output value, one of the plurality of array size values stored in one of the second plurality of memory locations which is associated with one of the first plurality of memory locations in which is stored one of the plurality of array reference entries that matches the array access instruction identifier;

(b) a first comparison element operatively coupled to the output section and configured to compare the maximum array size output value and the value of the location of the referenced element within the array and to provide a maximum violation signal if the value of the location of the referenced element within the array is greater than the maximum array size output value;

(c) a second comparison element operatively coupled to the output section, and configured to compare the minimum array size output value and the value of the location of the referenced element within the array and to provide a minimum violation signal if the value of the location of the referenced element within the array is less than the minimum array size output value; and (d) an exception element operatively coupled to the first and second comparison elements, and configured to provide an exception output signal in response to receipt of either the maximum violation signal or the minimum violation signal.

5. A method of verifying that a referenced element of an array is within a maximum array size boundary value and a minimum array size boundary value, the method comprising:

storing a plurality of array reference entries in a first memory section that includes a first plurality of memory locations, wherein each one of the first plurality of memory locations is configured to store one of the plurality of array reference entries, and further wherein each one of the plurality of array reference entries corresponds to one of a plurality of array access instructions;

storing a plurality of array size values in a second memory section that includes a second plurality of memory locations, wherein each one of the second plurality of memory locations is configured to store one of the array size values and is associated with one of the first plurality of memory locations, and further wherein each one of the plurality of array size values is associated with one of the plurality of array access instructions and comprises a maximum array size value and a minimum array size value;

simultaneously comparing an array access instruction identifier with at least a portion of each of the stored plurality of array reference entries, wherein the array access instruction identifier identifies an array access instruction;

providing as an array size output value one of the plurality of array size values stored in one of the second plurality of memory locations which is associated with one of the first plurality of memory locations in which is stored one of the plurality of array reference entries that matches the array access instruction identifier wherein said array size output value includes said maximum array size value as a maximum array size output value, and said minimum array size value as a minimum array size output value;

comparing the maximum array size output value and a value of a location of the referenced element within said array, and generating a maximum violation signal if the value of the location of the referenced element within said array is greater than the maximum array size output value;

comparing the minimum array size output value and the value of the location of the referenced element within said array, and generating a minimum violation signal if the value of the location of the referenced element within said array is less than the minimum array size output value; and providing an exception output signal in response to generation of either the maximum violation signal or the minimum violation signal.

6. A method to verify that a referenced element of an array is within a maximum array size boundary value and a minimum array size boundary value, the method comprising:

providing an associative memory element configured to store and retrieve array size values which are associated with one of a plurality of array access instructions, each array access instruction referencing a value of a location of an element within the array;

providing a first comparison element operatively coupled to an output section of the associative memory element, the first comparison element configured to compare a predetermined maximum array size value and the value of the location of the referenced element within the array, and to provide a maximum violation signal if the value of the location of the referenced element within the array is greater than the predetermined maximum array size value;

providing a second comparison element operatively coupled to the output section of the associative memory element, the second comparison element configured to compare a predetermined minimum array size value and the value of the location of the referenced element within the array, and to provide a minimum violation signal if the value of the location of the referenced element within the array is less than the predetermined minimum array size value; and providing an exception element operatively coupled to the first and second comparison elements, the exception element configured to provide an exception signal in response to receipt of either the maximum violation signal or the minimum violation signal.

7. The method of claim 6 further comprising:

providing a first memory section in the associative memory element that includes a first plurality of memory locations configured to receive and store a plurality of array reference entries, wherein each one of the first plurality of memory locations is configured to store one of the plurality of array reference entries, and further wherein each one of the plurality of array reference entries corresponds to one of the plurality of array access instructions;

providing an input section, operatively coupled to the first memory section, configured to receive an array access instruction identifier and to simultaneously compare the array access instruction identifier with at least a portion of each of the stored plurality of array reference entries, wherein the array access instruction identifier identifies an array access instruction;

providing a second memory section in the associative memory element that includes a second plurality of memory locations configured to receive and store a plurality of array size values, wherein each one of the second plurality of memory locations is configured to store one of the array size values and is associated with one of the first plurality of memory locations, and further wherein each one of the plurality of array size values is associated with one of the plurality of array access instructions and comprises a maximum array size value and a minimum array size value, and further wherein, the output section of the associative memory element is operatively coupled to the second memory section, and configured to provide, as an array size output value, one of the plurality of array size values stored in one of the second plurality of memory locations which is associated with one of the first plurality of memory locations in which is stored one of the plurality of array reference entries that matches the array access instruction identifier.

8. A method of providing an array boundary checking apparatus configured to verify that a referenced element of an array is within a maximum array size boundary value and a minimum array size boundary value, the method comprising:

(a) providing an associative memory element configured to store and retrieve a plurality of array size values, wherein each one of the array size values is associated with one of a plurality of array access instructions, the associative memory element including:

(i) a first memory section that includes a first plurality of memory locations configured to receive and store a plurality of array reference entries, wherein each one of the first plurality of memory locations is configured to store one of the plurality of array reference entries, and further wherein each one of the plurality of array reference entries corresponds to one of the plurality of array access instructions;

(ii) a second memory section that includes a second plurality of memory locations configured to receive and store a plurality of array size values, wherein each one of the second plurality of memory locations is configured to store one of the array size values and is associated with one of the first plurality of memory locations, and further wherein each one of the plurality of array size values is associated with one of the plurality of array access instructions and comprises a maximum array size value and a minimum array size value;

(iii) an input section operatively coupled to the first memory section, and configured to receive an array access instruction identifier and to simultaneously compare the array access instruction identifier with at least a portion of each of the stored plurality of array reference entries, wherein the array access instruction identifier identifies an array access instruction; and (iv) an output section operatively coupled to the second memory section, and configured to provide as an array size output value one of the plurality of array size values stored in one of the second plurality of memory locations which is associated with one of the first plurality of memory locations in which is stored one of the plurality of array reference entries that matches the array access instruction identifier wherein said array size output value includes said maximum array size value as a maximum array size output value, and said minimum array size value as a minimum array size output value;

(b) providing a first comparison element operatively coupled to the output section, and configured to compare a value of a location of the referenced element within the array and the maximum array size output value and to provide a maximum violation signal if the value of the location of the referenced element within the array is greater than the maximum array size output value;

(c) providing a second comparison element operatively coupled to the output section, and configured to compare the value of the location of the referenced element within the array and the minimum array size output value and to provide a minimum violation signal if the value of the location of the referenced element within the array is less than the minimum array size boundary value; and (d) providing an exception element operatively coupled to the first, and second comparison elements and configured to provide an exception output signal in response to receipt of either the maximum violation signal or the minimum violation signal.

9. A computer system comprising:

a translation unit configured to receive and translate a software program and, in accordance with the software program, provide a plurality of translated instructions and a plurality of instruction identifiers, wherein each one of the instruction identifiers corresponds to one of the plurality of translated instructions, the plurality of translated instructions including a plurality of array access instructions;

an execution unit configured to receive, in accordance with the plurality of instruction identifiers, the plurality of translated instructions, and, in accordance therewith, execute received translated instructions;

an associative memory element configured to store and retrieve array size values which are associated with one of a plurality of array access instructions, each array access instruction referencing a value of a location of an element within the array;

a first comparison element operatively coupled to an output section of the associative memory element, the first comparison element configured to compare a predetermined maximum array size value and the value of the location of the referenced element within the array, and to provide a maximum violation signal if the value of the location of the referenced element within the array is greater than the predetermined maximum array size value;

a second comparison element operatively coupled to the output section of the associative memory element, the second comparison element configured to compare a predetermined minimum array size value and the value of the location of the referenced element within the array and to provide a minimum violation signal if the value of the location of the referenced element within the array is less than the predetermined minimum array size value; and an exception element operatively coupled to the first and second comparison elements and the execution unit, the exception element configured to provide an exception signal to the execution unit in response to receipt of either the maximum violation signal or the minimum violation signal.

10. The computer system of claim 9 wherein the associative memory element further comprises:

a first memory section that includes a first plurality of memory locations configured to receive and store a plurality of array reference entries, wherein each one of the first plurality of memory locations is configured to store one of the plurality of array reference entries, and further wherein each one of the plurality of array reference entries corresponds to one of the plurality of array access instructions;

an input section operatively coupled to the first memory section, and configured to receive an array access instruction identifier and to simultaneously compare the array access instruction identifier with at least a portion of each of the stored plurality of array reference entries, wherein the array access instruction identifier identifies an array access instruction;

a second memory section that includes a second plurality of memory locations configured to receive and store a plurality of array size values, wherein each one of the second plurality of memory locations is configured to store one of the array size values and is associated with one of the first plurality of memory locations, and further wherein each one of the plurality of array size values is associated with one of the plurality of array access instructions and comprises a maximum array size value and a minimum array size value, and further wherein the output section of the associative memory element is operatively coupled to the second memory section, and configured to provide, as an array size output value, one of the plurality of array size values stored in one of the second plurality of memory locations which is associated with one of the first plurality of memory locations in which is stored one of the plurality of array reference entries that matches the array access instruction identifier.

11. A computer system comprising:

a translation unit configured to receive and translate a software program and, in accordance with the software program, provide a plurality of translated instructions and a plurality of instruction identifiers, wherein each one of the instruction identifiers corresponds to one of the plurality of translated instructions, the plurality of translated instructions including a plurality of array access instructions;

an execution unit configured to receive, in accordance with the plurality of instruction identifiers, the plurality of translated instructions, and, in accordance therewith, execute received translated instructions; and an associative memory element configured to store and retrieve a plurality of array size values, wherein each one of the array size values is associated with one of a plurality of array access instructions, the associative memory element including:

(i) a first memory section that includes a first plurality of memory locations configured to receive and store a plurality of array reference entries, wherein each one of the first plurality of memory locations is configured to store one of the plurality of array reference entries, and further wherein each one of the plurality of array reference entries corresponds to one of the plurality of array access instructions;

(ii) a second memory section that includes a second plurality of memory locations configured to receive and store a plurality of array size values, wherein each one of the second plurality of memory locations is configured to store one of the array size values and is associated with one of the first plurality of memory locations, and further wherein each one of the plurality of array size values is associated with one of the plurality of array access instructions and comprises a maximum array size value and a minimum array size value;

(iii) an input section operatively coupled to the first memory section, and configured to receive an array access instruction identifier and to simultaneously compare the array access instruction identifier with at least a portion of each of the stored plurality array reference entries, wherein the array access instruction identifier identifies an array access instruction; and (iv) an output section operatively coupled to the second memory section and configured to provide, as an array size output value, one of the plurality of array size values stored in one of the second plurality of memory locations which is associated with one of the first plurality of memory locations in which is stored one of the plurality of array reference entries that matches the array access instruction identifier;

a first comparison element operatively coupled to the output section of the associative memory element, and configured to compare a value of a location of the referenced element within the array and the maximum array size output value and to provide a maximum violation signal if the value of the location of the referenced element within the array is greater than the maximum array size output value;

a second comparison element operatively coupled to the output section of the associative memory element, and configured to compare the value of the location of the referenced element within the array and the minimum array size output value and to provide a minimum violation signal if the value of the location of the referenced element within the array is less than the minimum array size output value; and an exception element operatively coupled to the first and second comparison elements and the execution unit, configured to provide an exception output signal to the execution unit in response to receipt of either the maximum violation signal or the minimum violation signal, wherein the execution unit is configured to respond to the exception output signal by executing a sequence of translated instructions that define an array access boundary exception subroutine.

* * * * *

UNITED STATES PATENT AND TRADEMARK OFFICE
CERTIFICATE OF CORRECTION

PATENT NO. : 6,014,723
DATED : January 11, 2000
INVENTOR(S) : Marc Tremblay and James Michael O'Connor It is certified that error appears in the above-identified patent and that said Letters Patent is hereby corrected as shown below:

Column 28,
Line 44, delete "refernced" an substitute -- referenced --.

Column 29,
Line 22, delete "section" and substitute -- section, --.

Column 34,
Line 29, delete "section" and substitute -- section, --.
Line 38, delete "the" and substitute -- a --.

Signed and Sealed this

Twenty-first Day of May, 2002

Attest:

JAMES E. ROGAN
*Attesting Officer*     *Director of the United States Patent and Trademark Office*